US012728437B2

(12) United States Patent
Logan et al.

(10) Patent No.: US 12,728,437 B2
(45) Date of Patent: *Sep. 8, 2026

(54) MULTI-CARTRIDGE DRAIN GUNS, ACCESSORIES THEREFOR, AND METHODS OF USE AND MANUFACTURE THEREOF

(71) Applicant: DiversiTech Corporation, Duluth, GA (US)

(72) Inventors: Mark Campbell Logan, Atlanta, GA (US); Bryce Lowe, Atlanta, GA (US); James A. Kitchen, Lawrenceville, GA (US); Jonathan Sada, Lawrenceville, GA (US); Keith Platt, Snellville, GA (US)

(73) Assignee: DiversiTech Corporation, Duluth, GA (US)

( * ) Notice: Subject to any disclaimer, the term of this patent is extended or adjusted under 35 U.S.C. 154(b) by 403 days.

This patent is subject to a terminal disclaimer.

(21) Appl. No.: 18/234,161

(22) Filed: Aug. 15, 2023

(65) Prior Publication Data

US 2024/0269702 A1 Aug. 15, 2024

Related U.S. Application Data

(60) Continuation of application No. 16/991,746, filed on Aug. 12, 2020, now Pat. No. 11,731,152, which is a (Continued)

(51) Int. Cl.

*B05B 12/14* (2006.01)
*B08B 9/032* (2006.01)
*E03C 1/304* (2006.01)

(52) U.S. Cl.

CPC ........ *B05B 12/1409* (2013.01); *B08B 9/0325* (2013.01); *E03C 1/304* (2013.01); *B08B 2209/032* (2013.01)

(58) Field of Classification Search

CPC .............. B05B 12/1409; B08B 9/0325; B08B 2209/032; E03C 1/304

See application file for complete search history.

(56) References Cited

U.S. PATENT DOCUMENTS

| | | |
|---|---|---|
| D191,686 S | 10/1961 | Johnson et al. |
| 3,014,619 A | 12/1961 | Moran |

(Continued)

FOREIGN PATENT DOCUMENTS

| | | |
|---|---|---|
| CN | 102245312 | 11/2011 |
| CN | 103298564 | 9/2013 |

(Continued)

OTHER PUBLICATIONS

Airstar Supply Replacement for DiversiTech GG-1 Charles Gallo Drain Gun for A/C Condensate Lines, on Amazon https://www.amazon.com/Replacement-DiversiTech-Charles-Gallo-Condensate/dp/B07D18HB2Y/ref=sr_1_7?keywords=%22gallo+gun%22&qid=1560453857&s=gateway&sr=8-7, downloaded from internet Jun. 24, 2019 (5 pages).

(Continued)

*Primary Examiner* — Jeremy Carroll
(74) *Attorney, Agent, or Firm* — Dentons US LLP

(57) ABSTRACT

A drain gun includes a handle and a trigger. The handle includes a channel and a plurality of inlets. The inlets feed the channel. The trigger causes a staged release of a plurality of fluids from a plurality of cartridges to the channel via the inlets when the cartridges are stored in the handle and feeding the inlets.

20 Claims, 18 Drawing Sheets

Related U.S. Application Data division of application No. 16/429,319, filed on Jun. 3, 2019, now Pat. No. 10,744,525.

(56) References Cited

U.S. PATENT DOCUMENTS

| | | | | |
|---|---|---|---|---|
| 3,789,861 | A | 2/1974 | Conn et al. | |
| 4,063,317 | A | 12/1977 | Santore | |
| 4,097,937 | A | 7/1978 | Hofmann | |
| 4,382,552 | A | 5/1983 | Lubsen et al. | |
| 4,629,128 | A | 12/1986 | Lawrence | |
| 4,773,357 | A | 9/1988 | Scharton et al. | |
| 5,249,311 | A * | 10/1993 | Rau | E03C 1/306 4/255.05 |
| 5,416,947 | A * | 5/1995 | Jaffe | B08B 9/0326 15/406 |
| 5,421,904 | A | 6/1995 | Carlson | |
| 5,530,988 | A | 7/1996 | McQuillan | |
| 5,590,696 | A | 1/1997 | Phillips et al. | |
| 5,628,136 | A | 5/1997 | Wickser, Jr. | |
| 5,732,752 | A * | 3/1998 | Glessner | B63C 9/24 141/330 |
| 5,803,101 | A * | 9/1998 | Gallo | E03F 9/00 134/22.12 |
| 5,996,597 | A | 12/1999 | Gallo | |
| 6,301,917 | B1 | 10/2001 | Lacoste | |
| 6,892,401 | B1 | 5/2005 | Mangum | |
| 7,124,962 | B1 | 10/2006 | Fryan et al. | |
| 7,275,663 | B2 | 10/2007 | Campbell | |
| 7,513,442 | B2 * | 4/2009 | Dodd | B01F 25/316 239/347 |
| 7,877,821 | B1 | 2/2011 | Prestia | |
| 8,136,698 | B1 | 3/2012 | Beaulieu | |
| 8,418,275 | B1 | 4/2013 | Dondurur et al. | |
| 8,776,281 | B2 | 7/2014 | Dondurur et al. | |
| 8,794,484 | B2 * | 8/2014 | Vezzosi | G05G 9/00 222/85 |
| 8,800,818 | B2 * | 8/2014 | Greenberg | B65D 83/68 222/266 |
| 9,051,721 | B2 | 6/2015 | Paulsen et al. | |
| 9,931,654 | B2 | 4/2018 | West et al. | |
| 10,065,204 | B2 | 9/2018 | Neal | |
| 2002/0170981 | A1 | 11/2002 | Decker et al. | |
| 2003/0028957 | A1 * | 2/2003 | Kawai | B08B 9/0321 4/255.01 |
| 2005/0230434 | A1 | 10/2005 | Campbell et al. | |
| 2006/0096060 | A1 | 5/2006 | Zhang | |
| 2006/0282941 | A1 | 12/2006 | Wang | |
| 2007/0131794 | A1 | 6/2007 | Lai et al. | |
| 2007/0266485 | A1 | 11/2007 | Tackett | |
| 2009/0044372 | A1 | 2/2009 | Knopow et al. | |
| 2009/0320889 | A1 | 12/2009 | Holley, Jr. | |
| 2010/0132101 | A1 | 6/2010 | Bates et al. | |
| 2011/0016658 | A1 | 1/2011 | Xia | |
| 2011/0108300 | A1 | 5/2011 | Nagasaka et al. | |
| 2012/0031925 | A1 * | 2/2012 | Greenberg | B65D 81/3288 222/144.5 |
| 2012/0159700 | A1 | 6/2012 | Iacampo, Sr. | |
| 2014/0062077 | A1 | 3/2014 | Hurley | |
| 2014/0342600 | A1 | 11/2014 | Esses | |
| 2015/0074889 | A1 | 3/2015 | Donohue et al. | |
| 2015/0232317 | A1 | 8/2015 | Donohue et al. | |
| 2016/0089683 | A1 | 3/2016 | Hu | |
| 2016/0106509 | A1 | 4/2016 | Worrell et al. | |
| 2017/0239455 | A1 | 8/2017 | Richards | |
| 2018/0133763 | A1 | 5/2018 | Kehoe | |
| 2019/0218765 | A1 * | 7/2019 | Wang | E03F 9/007 |

FOREIGN PATENT DOCUMENTS

| | | |
|---|---|---|
| CN | 203803838 | 9/2014 |
| FR | 2615545 | 11/1988 |
| JP | 2017221889 | 12/2017 |
| TW | 427930 | 4/2001 |
| TW | 200529932 | 9/2005 |
| TW | I559982 | 12/2016 |
| WO | WO2010065115 | 6/2010 |
| WO | WO2011036502 | 3/2011 |
| WO | WO2018089414 | 5/2018 |

OTHER PUBLICATIONS

Diversitech Corporation GT1BOR Galo Gun O-Rings, on Amazon https://www.amazon.com/DiversiTech-Corporation-GT1BOR-GALLO-RINGS/dp/B00QW2AB90/ref=sr_1_14?keywords=%22gallo+gun%22&qid=1560454106&s=gateway&sr=8-14, downloaded from internet Jun. 24, 2019 (3 pages).

DiversiTech GG-1 Charles Gallo Drain Gun, on Amazon https://www.amazon.com/DiversiTech-GG-1-Charles-Gallo-Drain/dp/B000R87H7O/ref=sr_1_3?keywords=%22gallo+gun%22&qid=1560454251&s=gateway&sr=8-3, downloaded from internet Jun. 24, 2019 (5 pages).

Diversitech GGC-12 Swoosh CO2 Gun Cartridges, 12-Pack, on Amazon https://www.amazon.com/Diversitech-GGC-12-Swoosh-Cartridges-12-Pack/dp/B00MHKQ17M/ref=sr_1_5?keywords=%22gallo+gun%22&qid=1560454191&s=gateway&sr=8-5, downloaded from internet Jun. 24, 2019 (7 pages).

DiversiTech, Drain Dawg and Drain Kat Fittings, https://www.diversitech.com/en-US/item/id/5423, downloaded from Internet Jun. 4, 2019, 5 pages.

DiversiTech, Drain Dawg Drain Cleaning Kit, https://www.diversitech.com/en-US/item/id/2927, downloaded from Internet Jun. 4, 2019, 5 pages.

DiversiTech, Drain Gun Portable Drain Cleaning Tool, https://www.diversitech.com/en-US/item/id/14367, downloaded from Internet Jun. 4, 2019, 5 pages.

DiversiTech, Drain Kat Mini Kit for Nitorgen or CO2, https://www.diversitech.com/en-US/item/id/2036, downloaded from Internet Jun. 4, 2019, 5 pages.

International Search Report and Written Opinion dated Oct. 15, 2019 in related International Application PCT/US19/35124 filed Jun. 3, 2019 (9 pages).

RedRock Threaded CO2 Cartridge Gallo Drain Gun Blaster Cleaner for A/C Condensate Lines with Drain Hose, on Amazon https://www.amazon.com/RedRock-Gallo-Drain-Condensate- Lines/dp/B01MFCKQWF/ref=sr_1_1_sspa?keywords=%22gallo+gun%22&qid=1560453996&s=gateway&sr=8-1-spons&psc=1, downloaded from internet Jun. 24, 2019 (7 pages).

Taiwan Office Action dated Nov. 22, 2021 in related application 108119101 filed Jun. 3, 2019 (15 pages).

* cited by examiner

MULTI-CARTRIDGE DRAIN GUNS, ACCESSORIES THEREFOR, AND METHODS OF USE AND MANUFACTURE THEREOF

CROSS-REFERENCE TO RELATED PATENT APPLICATIONS

This patent application is a Continuation of U.S. Utility patent application Ser. No. 16/991,746 filed 12 Aug. 2020; which is a Divisional of U.S. Utility patent application Ser. No. 16/429,319 filed 3 Jun. 2019, now U.S. Pat. No. 10,744,525 issued 18 Aug. 2020; each of which is herein incorporated by reference for all purposes.

BACKGROUND

A drain line (e.g. tube) can be used to conduct a condensate (e.g. water) from a first location (e.g. pump) to a second location (e.g. container). The drain line can get clogged for various reasons (e.g. algae). As such, a drain gun can be used to unclog the drain line.

SUMMARY

In an embodiment, a device comprises: a drain gun including a handle and a trigger, wherein the handle includes a channel and a plurality of check valves, wherein the check valves feed the channel, wherein the trigger causes a staged release of a plurality of fluids from a plurality of cartridges to the channel via the check valves when the cartridges are stored in the handle and feeding the check valves.

In an embodiment, a method comprises: causing a drain gun to be fluidly coupled to a drain line that is clogged, wherein the drain gun hosts a plurality of cartridges storing a plurality of fluids; and causing the fluids to be output from the drain gun controllably in stages such that the drain line is unclogged via the fluids.

In an embodiment, a device comprises: a drain gun including a handle and a trigger, wherein the handle includes a channel and a plurality of inlets, wherein the inlets feed the channel, wherein the trigger causes a staged release of a plurality of fluids from a plurality of cartridges to the channel via the inlets when the cartridges are stored in the handle and feeding the inlets.

In an embodiment, a device comprises: a drain gun including a handle and a trigger, wherein the handle includes a channel, an inlet, a pressure gauge, and a display, wherein the inlet feeds the channel, wherein the trigger causes a release of a fluid from a cartridge to the channel via the inlet when the cartridge is stored in the handle and feeding the inlet, wherein the display presents based on the pressure gauge, wherein the pressure gauge monitors the cartridge when the cartridge is stored in the handle and engaging the inlet.

In an embodiment, a method comprises: causing a barrel of a drain gun to be fluidly coupled with a tip of an adapter, wherein the adapter includes an inflatable portion, wherein the inflatable portion includes an end portion defining an opening therein, wherein the drain gun hosts a plurality of cartridges storing a plurality of fluids; causing the inflatable portion to be inserted into a drain line that is clogged, wherein the drain line includes an inner surface, wherein the inner surface faces the inflatable portion; and causing a release of the fluids from the cartridges such that the fluids travel via the barrel, the tip, and the inflatable portion to the opening, the inflatable portion is inflated thereby creating a seal against the inner surface, and the fluids are output via the opening into the drain line during the seal thereby at least partially unclogging the drain line.

In an embodiment, a method comprises: causing a shuttle to be inserted into an inlet of a drain line that is clogged, wherein the drain line includes an outlet; causing a source of a fluid to be fluidly coupled with the drain line; and causing a release of the fluid such that the fluid propels the shuttle down the drain line toward the outlet such that the drain line is at least partially unclogged via the shuttle.

In an embodiment, a method comprises: causing a stepped section with an outer surface and an open end to be inserted into a drain line with an inner surface such that the outer surface faces the inner surface, wherein the stepped section is coupled to a wingnut section, wherein the wingnut section is coupled to a fitting section, wherein the wingnut section includes a wingnut, wherein the stepped section is coupled to the fitting section, wherein the drain line is clogged; causing the wingnut to be rotated relative to the fitting section such that the outer surface engages against the inner surface thereby forming a seal; and causing a fluid to be input into the fitting section during the seal such that the fluid is output into the drain line via the open end during the seal thereby at least partially unclogging the drain line during the seal.

In an embodiment, a method comprises: causing a stepped section with an outer surface and an open end to be inserted into a drain line with an inner surface such that the outer surface faces the inner surface, wherein the stepped section is coupled to a cam lever, wherein the cam lever is coupled to a fitting section, wherein the cam lever defines an internal opening, wherein the stepped section is coupled to the fitting section, wherein the drain line is clogged; causing the cam lever to be rotated relative to the fitting section such that the outer surface engages against the inner surface thereby forming a seal and such that the fitting section extends through the internal opening without bending during the seal; and causing a fluid to be input into the fitting section during the seal such that the fluid is output into the drain line via the open end during the seal thereby at least partially unclogging the drain line during the seal.

In an embodiment, a method comprises: causing a stepped section with an outer surface and an open end to be inserted into a drain line with an inner surface such that the outer surface faces the inner surface, wherein the stepped section is coupled to a cam lever, wherein the cam lever is coupled to a fitting section, wherein the stepped section is coupled to the fitting section, wherein the fitting section is bendable, wherein the drain line is clogged; causing the cam lever to be rotated relative to the stepped section such that the outer surface engages against the inner surface thereby forming a seal and such that the cam lever urges the fitting section to bend during the seal based on the cam lever being rotated; and causing a fluid to be input into the fitting section during the seal such that the fluid is output into the drain line via the open end during the seal thereby at least partially unclogging the drain line during the seal.

In an embodiment, a method comprises: causing a stepped section with an outer surface and an open end to be inserted into a drain line with an inner surface such that the outer surface faces the inner surface, wherein the stepped section is coupled to a fitting section, wherein the drain line is clogged; causing the outer surface to engage against the inner surface thereby forming a seal; and causing a fluid to be input into the fitting section during the seal such that the fluid is output into the drain line via the open end during the seal thereby at least partially unclogging the drain line during the seal.

In an embodiment, a method comprises: causing a first tubular portion to be fluidly coupled to a source of a fluid; causing a second tubular portion to be fluidly coupled to a drain line that is clogged; and causing the fluid to be input into the first tubular portion such that the fluid travels from the first tubular portion to a third tubular portion while passing the second tubular portion such that a suction is formed at the second tubular portion and the drain line is at least partially unclogged via the suction.

In an embodiment, a method comprises: causing a stepped section with an outer surface and an open end to be inserted into a drain line with an inner surface such that the outer surface faces the inner surface, wherein the stepped section is coupled to a cam lever, wherein the cam lever is coupled to a fitting section, wherein the stepped section is coupled to the fitting section, wherein the fitting section is L-shaped, wherein the drain line is clogged; causing the cam lever to be rotated relative to the stepped section such that the outer surface engages against the inner surface thereby forming a seal; and causing a fluid to be input into the fitting section during the seal such that the fluid is output into the drain line via the open end during the seal thereby at least partially unclogging the drain line during the seal.

DETAILED DESCRIPTION

Generally, this disclosure discloses various drain guns, accessories therefor, and methods of use and manufacture thereof. For example, a drain gun can include a handle and a trigger. The handle can include a channel and a plurality of inlets, which can include a plurality of check valves. The inlets, inclusive of the check valves, can feed the channel. The trigger can cause a staged release of a plurality of fluids from a plurality of cartridges to the channel from the inlets, inclusive of the check valves, when the cartridges are stored in the handle and feeding the inlets, inclusive of the check valves. As such, when a drain line is clogged, then the drain line can be unclogged via the drain gun. For example, the drain line can drain from an heating, ventilation, and air conditioning (HVAC) system, a refrigeration system, or others. For example, the drain line can conduct a condensate (e.g. water) resulting from at least some operations of the HVAC system, the refrigeration system, or others. Further, various hoses, accessories, and adapters are provided that can work with the drain gun and other hoses, accessories, tips, and adapters for unclogging the drain line. For example, some of these include an inflatable tip adapter, a tethered shuttle, an expanding-grip stepped plug, and a Venturi effect suction fitting. However, note that this disclosure may be embodied in many different forms and should not be construed as necessarily being limited to various embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected," or "coupled" to another element, then the element can be directly on, connected, or coupled to another element or intervening elements can be present, including indirect or direct variants. In contrast, when an element is referred to as being "directly connected" or "directly coupled" to another element, then there are no intervening elements present.

As used herein, various singular forms "a," "an" and "the" are intended to include various plural forms as well, unless specific context clearly indicates otherwise.

As used herein, various presence verbs "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

Figure 1:
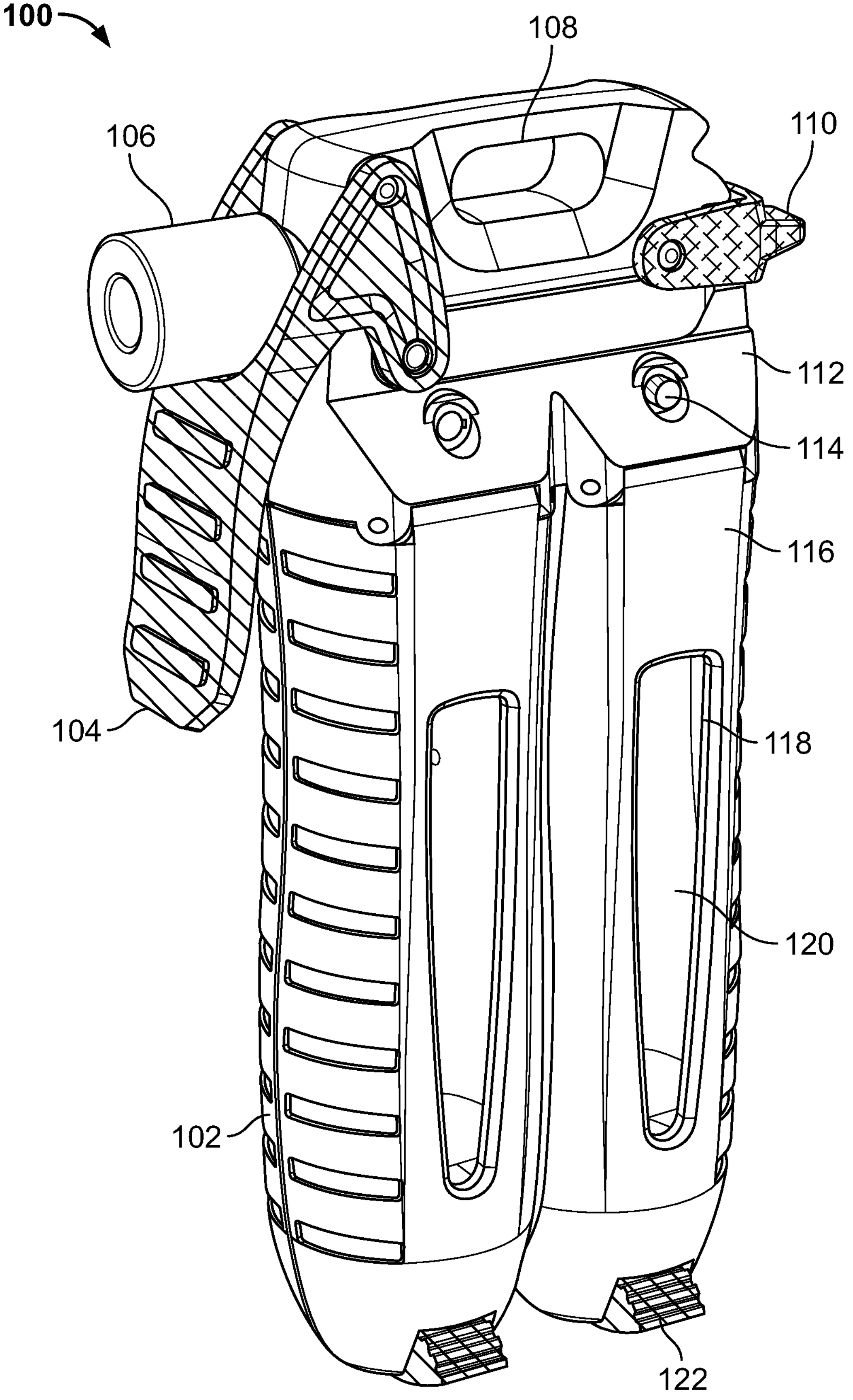
FIG. 1 shows an embodiment of a drain gun according to this disclosure.

FIG. 1 shows an embodiment of a drain gun according to this disclosure. In particular, a drain gun 100 includes a handle 102, a trigger 104, and a barrel 106. The trigger 104 and the barrel 106 are coupled (e.g. assembled, fastened, mated, interlocked, unitary) to the handle 102. The handle 102, the trigger 104, and the barrel 106 can include plastic, metal, rubber, or other materials. Although the handle 102, the trigger 104, and the barrel 106 are described relative to one lateral side (e.g. left side) of the drain gun 100, note that any side (e.g. front, rear, left, right) of the drain gun 100 can be configured as disclosed herein.

The handle 102 (e.g. housing, case, frame) defines an opening 108 (e.g. closed-shape, open-shaped, symmetrical, asymmetrical, O-shaped, D-shaped, rectangle, square, oval, circle, triangle) through which a strap, a hook (e.g. belt hook), or a carabiner can extend. The handle 102 hosts a safety lock 110, which is movable (e.g. laterally, longitudinally, pivotable, hinged, mated, fastened, interlocked) between an open position and a closed position, as further disclosed below. For example, the trigger 104 can be configured to not be able to be pressed when the safety lock 110 is in the closed position. For example, the safety lock 110 can be manually movable (e.g. user movable) or automatically movable between the open position and the closed position.

The handle 102 hosts a plate 112 defining a pair of openings for a plurality of displays 114. The openings can be of any shape (e.g. symmetrical, asymmetrical, closed-shape, open-shaped, O-shape, D-shape, rectangle, square, oval, circle, triangle). Note that the openings are identical to each other in terms of type, shape, or structure. However, the openings can be non-identical to each other in terms of type, shape, or structure (and the handle 102 can be adapted for such variations). The displays 114 are analog, but can be digital (e.g. monochrome, color). For example, when the displays 114 are digital and when the handle 102 contains a battery, which can be rechargeable or replaceable, then the battery can power the displays 114. The displays 114 can output a content, such as a binary content (e.g. black/white, red/green, I/O, full/empty) or a gradual content (e.g. counter, odometer, scale/range, red/yellow/green, full/half/empty), as further disclosed below. Note that the displays 114 are identical to each other in terms of type, shape, weight, modality, or structure. However, the displays 114 can be non-identical to each other in terms of type, shape, weight, modality, or structure (and the handle 102 can be adapted for such variations).

The handle 102 hosts a plurality of covers 116, which can open and closed (e.g. pivot, slide, detach) as further disclosed below. The covers 116 include a plurality of openings 118. The openings 118 are tapered in shape, but that shaping can vary (e.g. symmetric, asymmetric, closed-shape, open-shape, D-shape, O-shape, rectangle, square, oval, circle, triangle). The openings 118 can host a plurality of windows (e.g. transparent, translucent, glass, plastic) or nets/screens/meshes or avoid hosting the windows or nets/screens/meshes and thereby enabling direct access into the handle 102. Note that the covers 116 can avoid the openings 118 as well. Note that the covers 116 are identical to each other in terms of type, shape, weight, or structure. However, the covers 116 can be non-identical to each other in terms of type, shape, weight, or structure (and the handle 102 can be adapted for such variations).

The handle 102 hosts a plurality of latches 122. The latches 122 are configured to engage with the covers 116 when the covers 116 are closed (e.g. pivoted closed, slid closed, attached closed), as further disclosed below. Note that the latches 122 are identical to each other in terms of type, shape, weight, or structure. However, the latches 122 can be non-identical to each other in terms of type, shape, weight, or structure (and the handle 102 can be adapted for such variations). Note that although the handle 102 includes the latches 122, there can be a single latch 122.

The handle 102 stores a plurality of cartridges 120 dependent or independent of each other. For example, there can be two, three, four, five, six, seven, eight, nine, ten, or more of the cartridges 120 stored in the handle 102. The cartridges 120 are visible through the openings 118. The handle 102 stores the cartridges 120 sequentially side-by-side. However, handle 102 can store the cartridges 120 differently, such as a bundle of cartridges 120 forming any shape (e.g. circle, oval, square, rectangle, octagon, pentagon, star, crescent). Note that the handle 102 can also store a single cartridge 120, whether or not the handle 102 is configured for storing at least two of the cartridges 120. For example, the handle 102 can be configured to only receive and only store the single cartridge 120.

The cartridges 120 can store a plurality of fluids (e.g. gas, liquid) under pressure. For example, the fluids can include a compressed gas (e.g. air, carbon dioxide, nitrogen, hydrogen), whether the compressed gas is flammable or non-flammable. For example, at least one of the cartridges 120 can be a disposable sixteen gram steel carbon dioxide cartridge. Note that although the cartridges 120 are identical, the cartridges 120 can also be non-identical to each other in terms of type, shape, weight, volume, texture, content, or structure (and the handle 102 can be adapted for such variations). Likewise, the fluids can be identical or non-identical to each other in terms of content, chemistry, type, pressure, color, temperature, volume, or other fluid characteristics (and the drain gun 100 can be adapted for such variations). Note that at least one of the cartridges 102 can store at least two fluids (e.g. at least two liquids, at least two gases, at least one liquid and at least one gas), whether identical or non-identical to each other in terms of content, chemistry, type, pressure, color, temperature, volume, or other fluid characteristics. In one mode of operation, the drain gun 100 provides a staged release of the fluids from the cartridges 120, as activated via the trigger 104, via the barrel 106.

Figure 2:
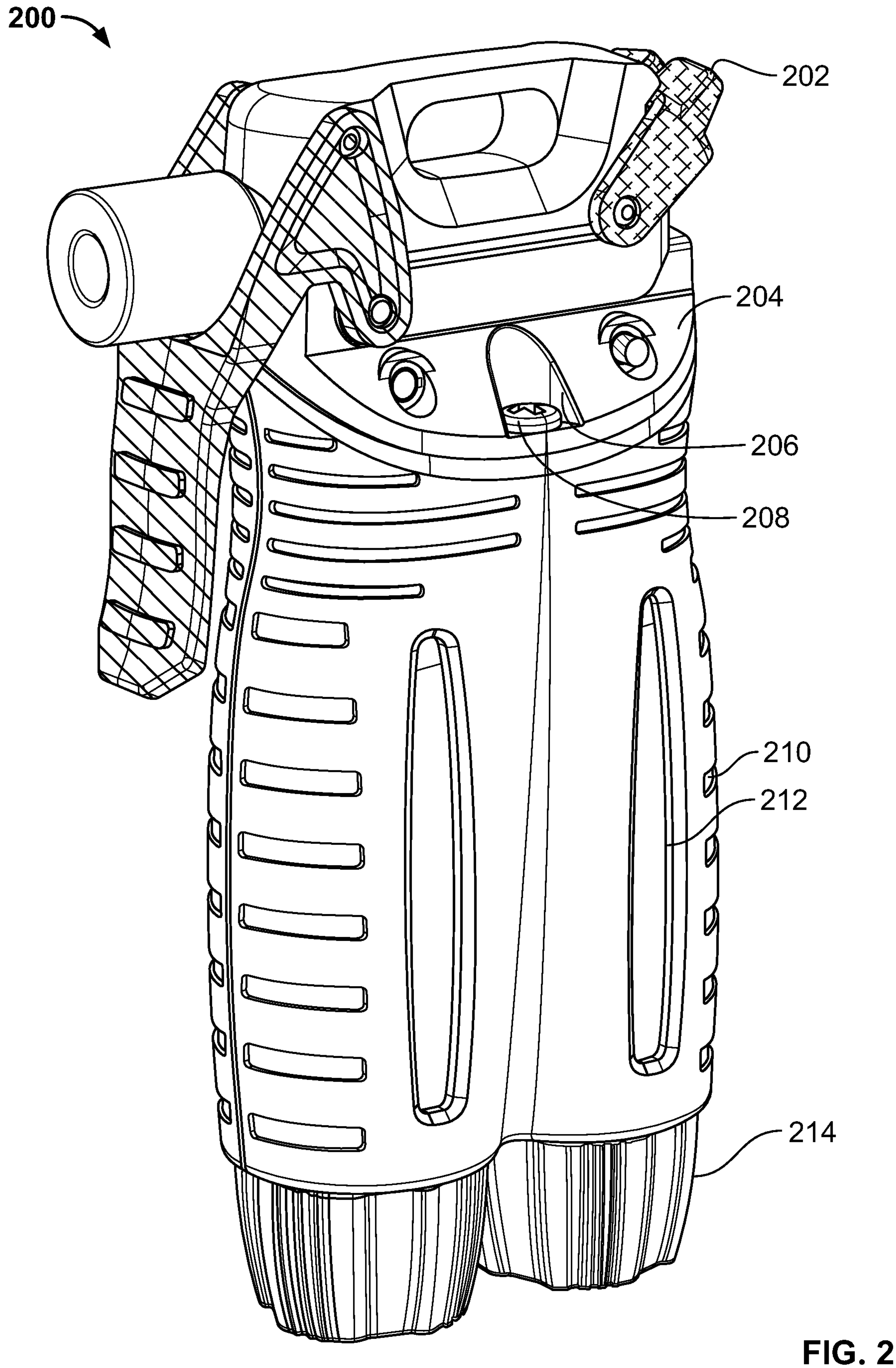
FIG. 2 shows an embodiment of a drain gun according to this disclosure.

FIG. 2 shows an embodiment of a drain gun according to this disclosure. In particular, a drain gun 200 is similar to the drain gun 100. However, there are some differences. The drain gun 200 includes a handle 210 defining a plurality of openings 212. The openings 212 are dual direction tapered in shape, but that shaping can vary (e.g. symmetric, asymmetric, closed-shape, open-shaped, D-shape, O-shape, rectangle, square, oval, circle, triangle, single-direction tapered). Note that the openings 212 are identical to each other in terms of type, shape, or structure. However, the openings 212 can be non-identical to each other in terms of type, shape, or structure (and the handle 210 can be adapted for such variations). The openings 212 can host a plurality of windows (e.g. transparent, translucent, glass, plastic) or nets/screens/meshes or avoid hosting the windows or nets/screens/meshes and thereby enabling direct access into the handle 210. Note that the handle 210 can avoid the openings 212. Further, note that the windows or nets/screens/meshes are identical to each other in terms of type, shape, weight, or structure. However, the windows or nets/screens/meshes can be non-identical to each other in terms of type, shape, weight, or structure (and the handle 210 can be adapted for such variations).

The handle 210 hosts a safety lock 202 that is movable (e.g. longitudinally, laterally, pivotable, hinged, mated, fastened, interlocked) between an open position and a closed position. The handle 210 hosts a plate 204 defining a cavity 206 (e.g. closed-shaped, open-shaped, symmetrical, asymmetrical, O-shaped, D-shaped, rectangle, square, oval, circle, triangle) through which a fastener 208 (e.g. bolt, screw) secures the plate 204 to the handle 210. However, note that the fastener 208 can be absent and the plate 204 is secured to the handle 210 in other ways (e.g. adhering, mating, interlocking, magnetizing).

The handle 210 hosts a plurality of caps 214 coupled (e.g. fastened, mated, snapped, interlocked) thereto. The caps 214 can include plastic, metal, or other materials. The caps 214 are externally grooved, bumped, or knurled for grip enhancement, but can be externally smooth. The caps 214 can be of any shape (e.g. tubular, cylinder, dome, cuboid, cube, hemisphere, pyramid, cone). Note that the caps 214 are identical to each other in terms of type, shape, weight, or structure. However, the caps 214 can be non-identical to each other in terms of type, shape, weight, or structure (and the handle 210 can be adapted for such variations).

Figure 3:
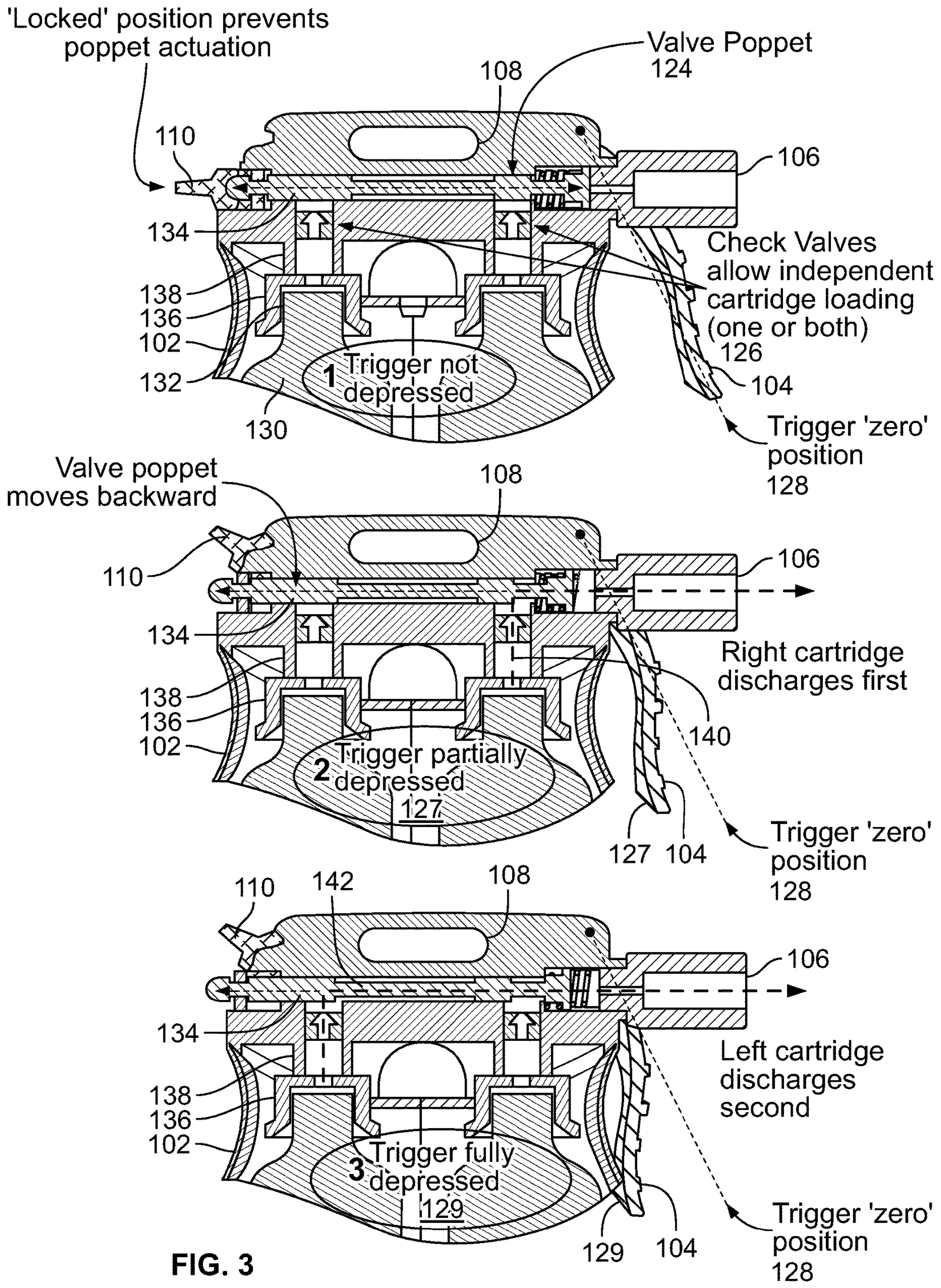
FIG. 3 shows an embodiment of a trigger action of a drain gun according to this disclosure.

FIG. 3 shows an embodiment of a trigger action of a drain gun according to this disclosure. In particular, the drain gun 100 (or the drain gun 200) includes the handle 102 hosting a channel 134, a plurality of inlets 138, a plurality of check valves 126, and a plurality of nozzles 136.

The channel 134 is longitudinally rectilinear between the barrel 106 and the safety lock 110, but can be longitudinally non-rectilinear (e.g. arcuate, sinusoidal). The channel 134 has a circular lateral cross-section, but can have a non-circular lateral cross-section (e.g. square, rectangle, oval, triangle). The channel 134 is a hollow tube (e.g. metal, plastic) extending within the handle 102, but can be a hollow cavity defined within the handle 102. The channel 134 can extend between the opening 108 and the cavity 206.

The channel 134 has a front end portion (e.g. open) and a rear end portion (e.g. open). The front end portion of the channel 134 feeds the barrel 106 (e.g. fluid communication between the front end portion of the channel 134 and the barrel 106). As such, at least some output from the front end portion of the channel 134 is directed to the barrel 106. The rear end portion of the channel 134 is in proximity (e.g. within about 2 inches) of the safety lock 110, which can operably engage therewith, as further disclosed below.

The inlets 138 are longitudinally rectilinear between the barrel 106 and the safety lock 110, but can be longitudinally non-rectilinear (e.g. arcuate, sinusoidal). The inlets 138 have a circular lateral cross-section, but can have a non-circular lateral cross-section (e.g. square, rectangle, oval, triangle). Each of the inlets 138 is a hollow tube (e.g. metal, plastic, rubber) extending within the handle 102, but can be a hollow cavity defined within the handle 102. The cavity 206 can be positioned between the inlets 138. The inlets 138 feed the channel 134 (e.g. fluid communication between the channel 134 and the inlets 138 between the front end portion of the channel 134 and the rear end portion of the channel 134). For example, the inlets 138 and the channel 134 define a U-shape or a C-shape thereby, although other shapes are possible (e.g. J-shape, S-shape). As such, at least some output from the inlets 138 is directed to the channel 134 between the front end portion of the channel 134 and the rear end portion of the channel 134. Note that the inlets 138 are identical to each other in terms of type, shape, weight, or structure. However, the inlets 138 can be non-identical to each other in terms of type, shape, weight, or structure (and the handle 102 can be adapted for such variations).

The inlets 138 can host (e.g. internally) the check valves 126 between the barrel 106 and the safety lock 110. Each of the check valves 126 (e.g. one-way valve) allows a fluid (e.g. gas, liquid) to flow therethrough in only one direction. The check valves 126 can be two-port valves (e.g. two body openings—one for fluid to enter and one for fluid to exit). The check valves 126 can include plastic, metal, rubber, or other materials. The check valves 126 can include a ball check valve, a diaphragm check valve, a swing check valve, a stop check valve, a lift-check valve, an inline check valve, a duckbill valve, a pneumatic non-return valve, or other check valves. The check valves 126 can be configured to puncture or pierce the cartridges 120 (e.g. seal, cap, neck, top, sidewall) when the check valves 126 engage with the cartridges 120 via the nozzles 136. For example, the check valves 126 can host needles (e.g. rectilinear, non-rectilinear) or blades (e.g. rectilinear, non-rectilinear) configured to puncture or pierce the cartridges 120 (e.g. seal, cap, neck, top, sidewall) when the check valves 126 engage with the cartridges 120 via the nozzles 136. Note that the check valves 126 are identical to each other in terms of type, shape, weight, modality, or structure. However, the check valves 126 can be non-identical to each other in terms of type, shape, weight, modality, or structure (and the handle 102 can be adapted for such variations). The check valves 126 can operate independently of each other or dependently on each other. The check valves 126 (and the handle 102) can allow independent loading of the cartridges 120. Note that although the drain gun 100 (or the drain gun 200) are described with the check valves 126, the drain gun 100 (or the drain gun 200) can employ non-check valves (e.g. flow control valve, bidirectional valves). The check valves 126 feed the channel 134 (e.g. fluid communication between the check valves 126 and the channel 134 between the front end portion of the channel 134 and the rear end portion of the channel 134). As such, at least some output from the check valves 126 is directed to the channel 134 between the front end portion of the channel 134 and the rear end portion of the channel 134.

The inlets 138 are coupled to the nozzles 136 (e.g. fastened, mated, telescoped, adhered, magnetized, sealed, unitary, assembled). The nozzles 136 are configured to receive the cartridges 120 (e.g. fastening, mating, interlocking). As such, the cartridges 120 can be inserted into the nozzles 136 (e.g. longitudinally) and the nozzles 136 can receive (e.g. snugly, loosely, securely, magnetically, fastenably) the cartridges 120 when the cartridges are contained within the handle 102. For example, the cartridges 120 can thread into the nozzles 136 or magnetically attach to the nozzles 136.

The trigger 104 is coupled to a valve poppet 124 (e.g. mechanical linkages, gears, bars, cables, springs, shape-memory materials, pulleys, hinges, cams electric motors, actuators). The valve poppet 124 can be a single valve poppet 124 for the check valves 126 or there can be at least two of the valve poppets 124 for the check valves 126 (e.g. one-to-one correspondence).

The handle 102 stores (e.g. temporarily, permanently) the cartridges 120. The cartridges 120 can be positioned between the latches 122 and the channel 134 or the opening 108. The cavity 206 can be positioned between the cartridges 120. The cartridges 120 have a plurality of necks 132 and a plurality of bodies 130. The necks 132 longitudinally extend from the bodies 130 and are narrower than the bodies 130 in external diameter. For example, at least one of the cartridges 120 can be a disposable sixteen gram steel carbon dioxide cartridge. For example, the handle 102 can be configured to secure the cartridges 120 based on the cartridges 120 being fastened into the nozzles 136 and thereby pushing the necks 132 into the nozzles 136 where the cartridges 120 are punctured or pierced (e.g. seal, cap, neck, top, sidewall), sealed, and activated for use. Although the necks 132 and the bodies oppose each other within the handle 102, the neck 132 and the bodies can be offset relative to each other (e.g. one cartridge 120 is closer to the channel 134 than another cartridge 120, one neck 132 is closer to the channel 134 than another neck 132).

The handle 102 hosts the safety lock 110 opposite of the barrel 106 in proximity (e.g. within about 2 inches) of the rear end portion of the channel 134. The safety lock 110 is shown as a lever that is pivotable (e.g. manually, automatically) about a shaft (e.g. rectilinear, non-rectilinear, arcuate, sinusoidal, plastic, metal, bar, bolt, screw) extending into the handle 102, where the lever can pivot (e.g. manually, automatically) between the open position and the closed position. For example, the lever can pivot toward the opening 108 (e.g. open position) or away from the opening 108 (e.g. closed position) or vice versa. Note that although the safety lock 110 is described as the lever, the safety lock 110 can include a button, a slider, a dial, or another input device, whether additional or alternative to the lever. The trigger 104 and the safety lock 110 (e.g. lever) can be mechanically linked (e.g. mechanical linkages, gears, bars, cables, springs, shape-memory materials, pulleys, hinges, cams, electric motors, actuators) to each other such that at least some operations of the trigger 104 depend on whether the safety lock 110 is in the closed position or the open position (e.g. as user controlled).

When the safety lock 110 is in the closed position (e.g. away from the opening 108) and the trigger 104 is at a default position 128 (e.g. zero stage), then the rear end portion of the channel 134 avoids at least some fluid communication with an ambient environment external to the rear end portion of the channel 134 (e.g. external to the handle 102). As such, this configuration can create a state of being where actuation of the valve poppet 124 via the trigger 104 is effectively reduced, minimized, or prevented (e.g. negative pressure, vacuum, movement stops) and the trigger 104 remains at the default position 128 when pressed (e.g. not depressed).

When the safety lock 110 is in the open position (e.g. moved toward the opening 108) and the trigger 104 is at a first position 127 (e.g. first stage), then the rear end portion of the channel 134 is in at least some fluid communication with the ambient environment external to the rear end portion of the channel 134 (e.g. external to the handle 102). Resultantly, this configuration can create a state of being where the valve poppet 124 is lifted, moved backward or forward, or sideways via the trigger 104 being at the first positon 127 (e.g. partially depressed). Consequently, this positioning of the valve poppet 124 allows at least one of the check valves 126 to source at least some fluid from at least one of the cartridges 120 to travel along a path 140 through at least one of the inlets 138, respectively, and guide that fluid into the channel 134, which in turn guides that fluid to the front end portion of the channel 134 and then into the barrel 106 for subsequent output therefrom. Note that this state of being can also keep at least one of the check valves 126 closed such that at least some fluid from at least one of the cartridges 120 does not travel along the path 140 and is not input into the channel 134 via at least one of the inlets 138, respectively. Accordingly, releasing the trigger 104 such that the trigger 104 moves from the first position 127 to the default position 128 would in turn enable the valve poppet 124 to be lifted, moved backward or forward, or sideways and thereby shut or close at least one of the check valves 126 and effectively stop or reduce flow of at least some fluid along the path 140 from at least some of the cartridges 120. Note that at least some fluid in the cartridges 120 flows from the bodies 130 to the necks 132, while the necks 132 are extending within the nozzles 136, and then along the path 140 to the check valves 126 via the inlets 136 and then to the channel 134 and then to the barrel 106. Further, note that the trigger 104 can avoid contacting the handle 102 in the first position 127 in at least two places (e.g. internally and externally).

When the safety lock 110 is or remains in the open position (e.g. moved toward the opening 108) and the trigger 104 is at or further moved from the first position 127 to a second position 129 (e.g. second stage), then the rear end portion of the channel 134 is or remains in at least some fluid communication with the ambient environment external to the rear end portion of the channel 134 (e.g. external to the handle 102). Resultantly, this configuration can create a state of being where the valve poppet 124 is or is further lifted, moved backward or forward, or sideways via the trigger 104 being at or further moved to the second positon 129 (e.g. fully depressed). Consequently, this positioning of the valve poppet 124 allows at least one of the check valves 126 (e.g. different from one during first stage) to source at least some fluid from at least one of the cartridges 120 to travel along a path 142 through at least one of the inlets 138, respectively, and guide that fluid into the channel 134, which in turn guides that fluid to the front end portion of the channel 134 and then into the barrel 106 for subsequent output therefrom. For example, the trigger 104 can contact the handle 102 in the second position 129 in at least two places (e.g. internally and externally). Note that this state of being can also keep or enable at least one of the check valves 126 to close (e.g. different from one during first stage) or be closed such that at least some fluid from at least one of the cartridges 120 does not travel along the path 142 and is not input into the channel 134 via at least one of the inlets 138, respectively. Note that this state of being can also allow that check valve 126 to remain open when that respective cartridge 120 is empty. Accordingly, releasing the trigger 104 such that the trigger 104 moves or further moves from the second position 129 to the first position 127 or the default position 128 would in turn enable the valve poppet 124 to be lifted, moved backward or forward, or sideways or further lifted, moved backward or forward, or sideways and thereby shut or close or further shut or close at least one of the check valves 126 and effectively stop or reduce or further reduce flow of at least some fluid along the path 142 from at least some of the cartridges 120. Note that at least some fluid in the cartridges 120 flows from the bodies 130 to the necks 132, while the necks 132 are within the nozzles 136, and then along the path 142 to the check valves 126 via the inlets 136 and then to the channel 134 and then to the barrel 106.

Note that although FIG. 3 shows a staged release from the cartridges 120 based on the trigger 104 being moved between the default position 128, the first position 127, and the second position 129, the drain gun 100 (or the drain gun 200) can be configured for a concurrent release from the cartridges 120 based on the trigger 104 being moved from the default position 128 to the first position 127 or the second position 129 or vice versa. Note that as the trigger 104 moves between the default position 128, the first position 127 (e.g. first stage), and the second position 129 (e.g. second stage), the trigger 104 can be configured to provide a haptic output (e.g. vibration, bump) that at least one of the default position 128, the first position 127, or the second position 129 is reached. As such, the trigger 104 can cause the staged release of the fluids from the cartridges 120 along the path 140 and the path 142 to the channel 134 from the check valves 126 when the cartridges 120 are stored in the handle 102 and feeding the check valves 126.

Note that although FIG. 3 shows the staged release occurring from a rightmost cartridge 120 to a leftmost cartridge 120, the staged release can be reversed and thereby occur from the leftmost cartridge 120 to the rightmost cartridge 120. If the handle 102 stores more than two of the cartridges 120 (e.g. three or more), then the staged release can be fixed in order, user adjustable in order (e.g. knob, button, or switch on handle 102 controlling staged release order), serial in order (e.g. toward trigger 104, away from trigger 104), parallel in order, or others.

Note that the handle 102 can be configured to control a degree of the staged release of the fluids from the cartridges 120. For example, one of the cartridges 120 can be outputting with one pressure, while another cartridge 120 can be outputting with another pressure. For example, such control of the degree of the staged release from the cartridges 120 can be done via the handle 102 having a user interface (e.g. button, knob, lever, switch, touchscreen) that controls (e.g. mechanically, electronically) at least one of the channel 134, at least one of the inlets 138, or at least one of the check valves 126. For example, this form of control can widen or narrow the channel 134 or at least one of the inlets 138. For example, this form of control can increase or decrease fluid amount being input into or output via at least one of the check valves 126.

Figure 4:
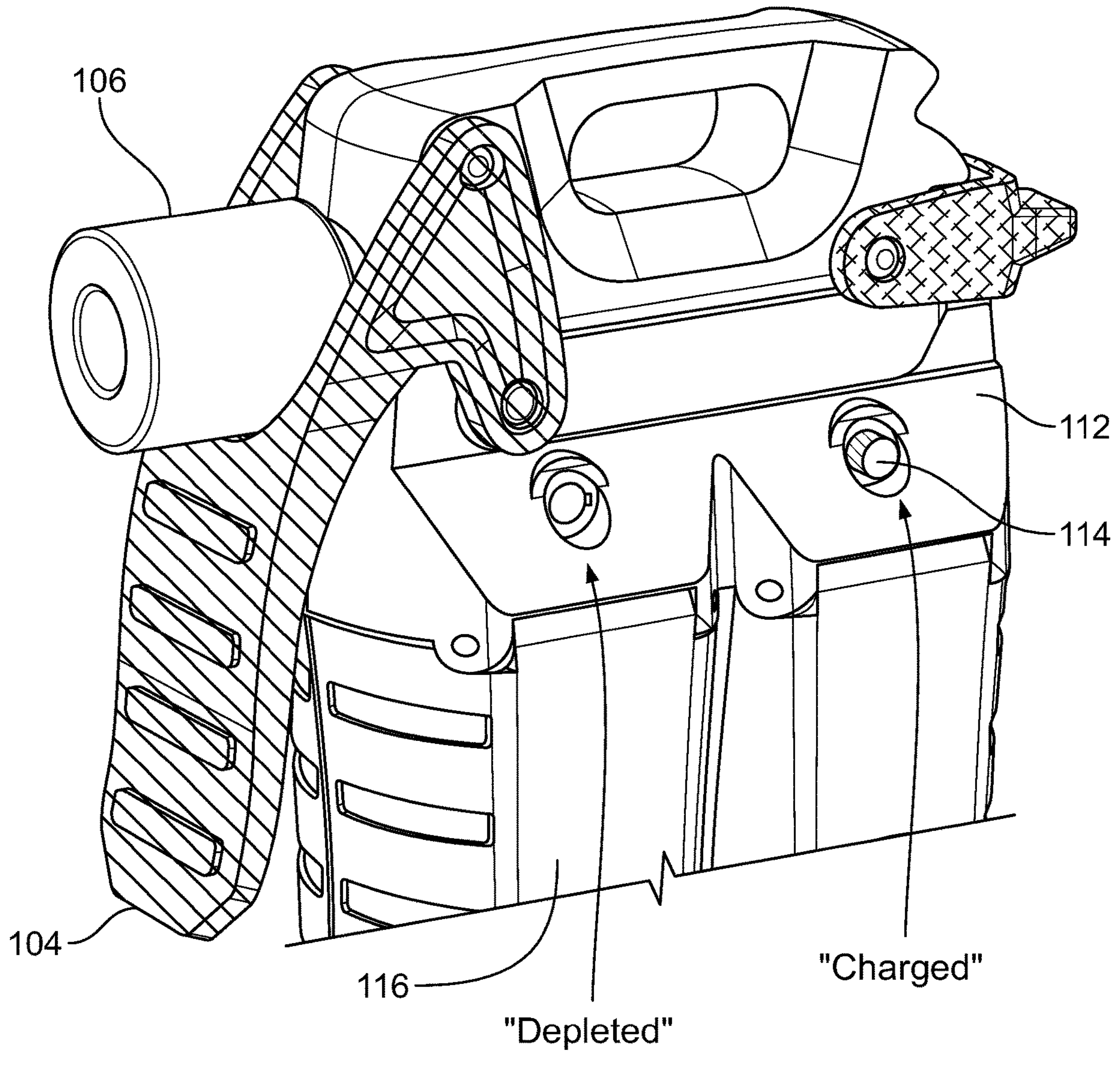
FIG. 4 shows an embodiment of a plurality of displays of a drain gun according to this disclosure.
Figure 5:
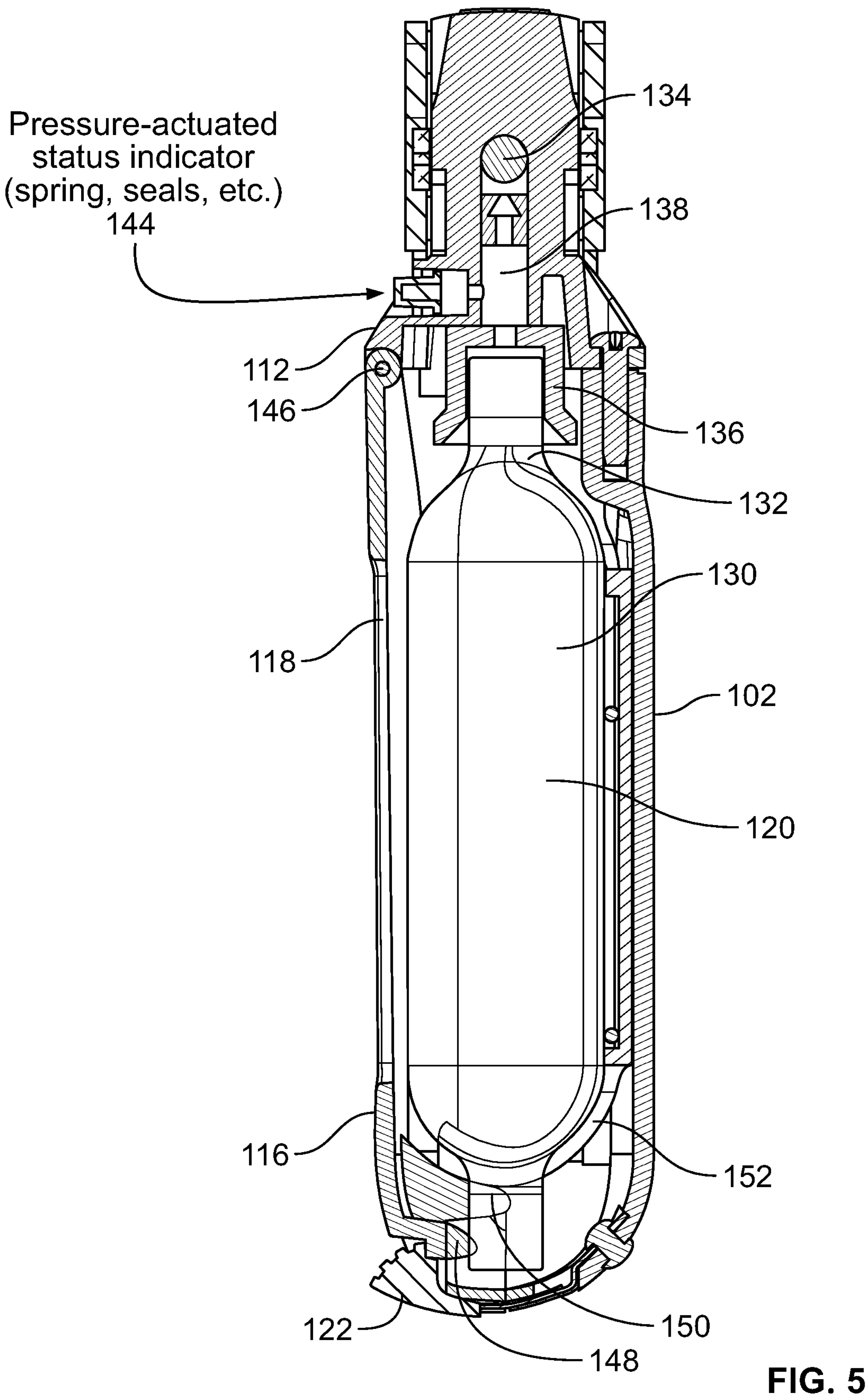
FIG. 5 shows an embodiment of a drain gun with a pressure gauge according to this disclosure.
Figure 6:
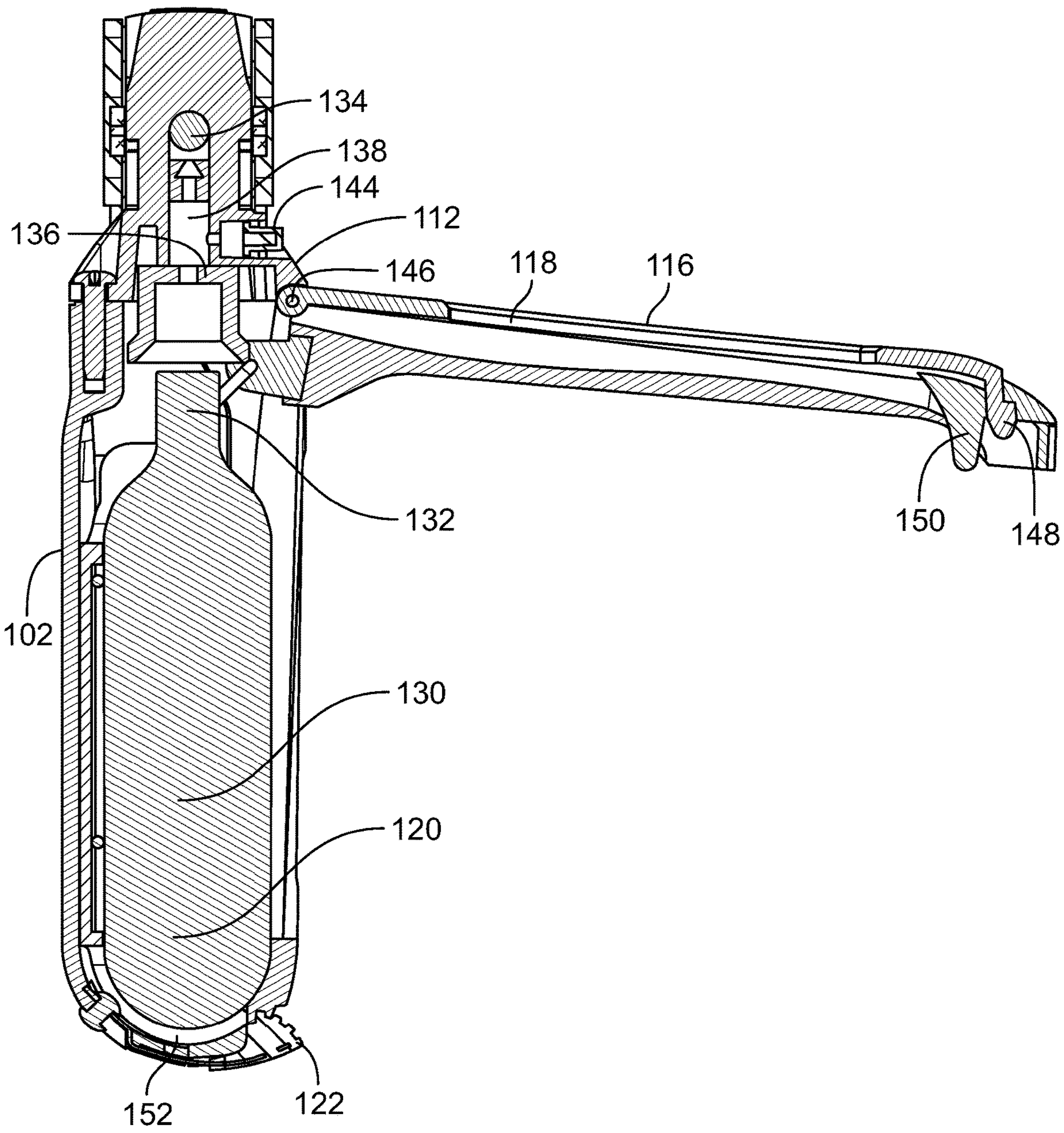
FIG. 6 shows an embodiment of a drain gun with a cover in an open position according to this disclosure.
Figure 7:
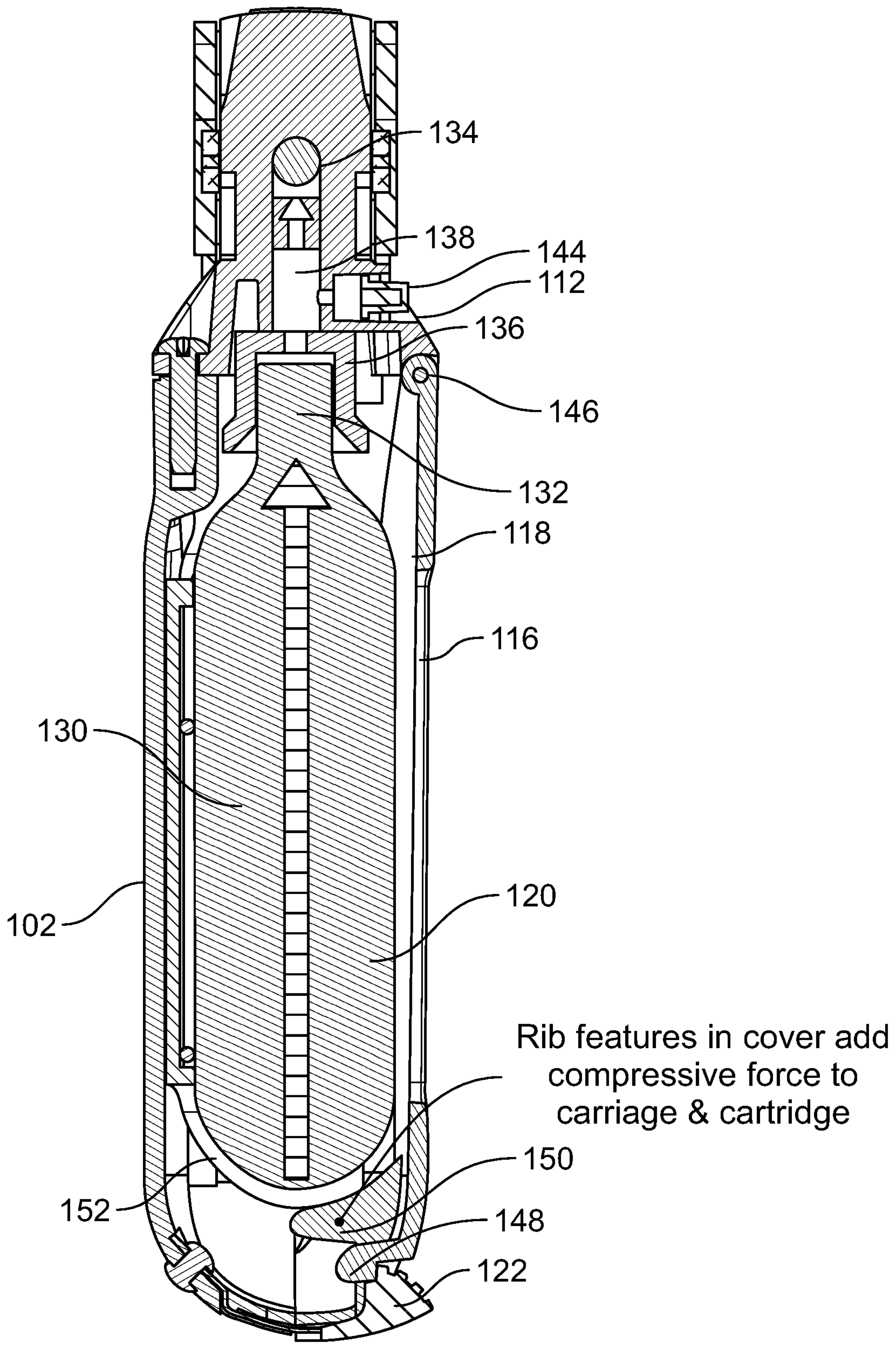
FIG. 7 shows an embodiment of a drain gun with a cover in a closed position according to this disclosure.
Figure 8:
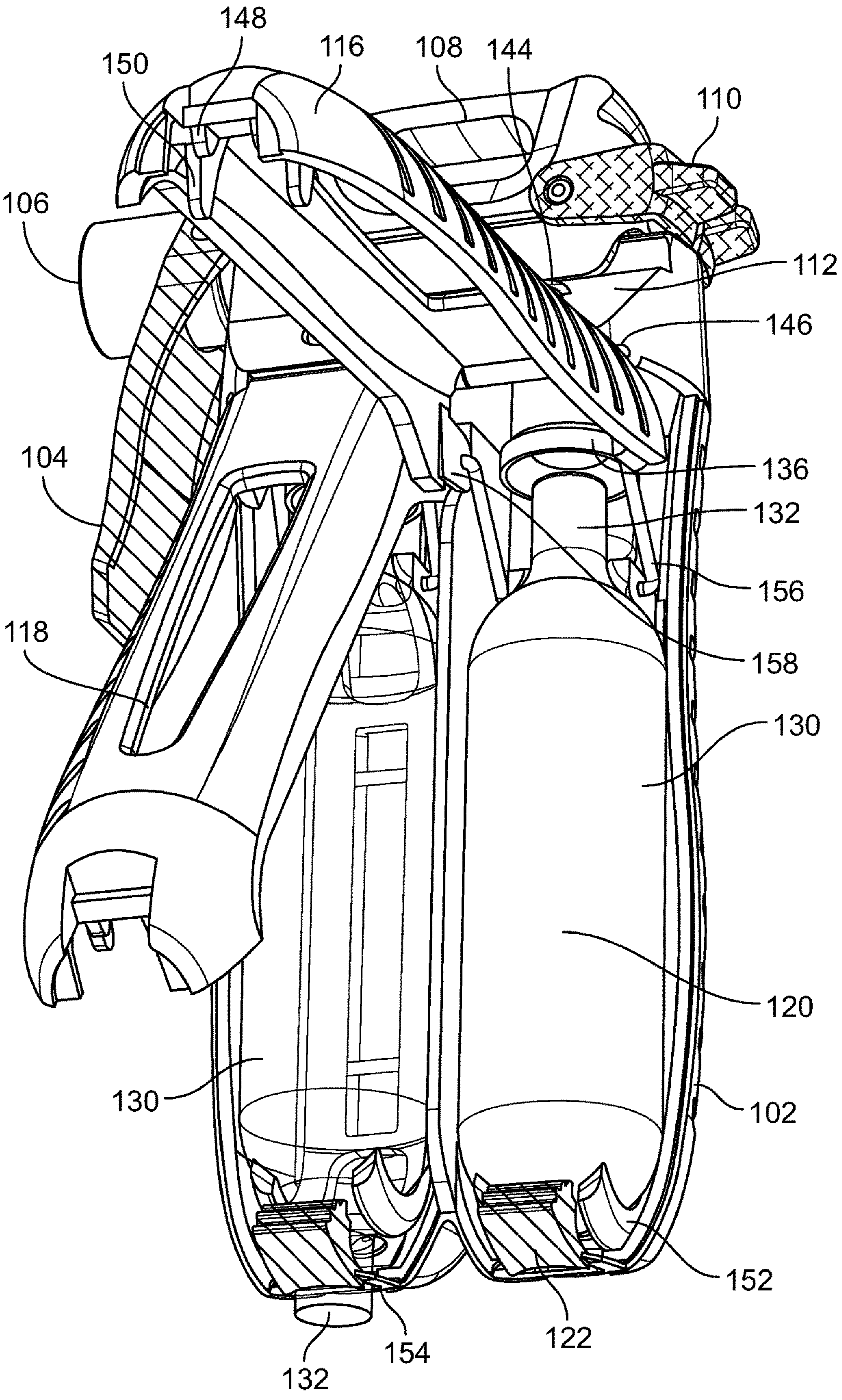
FIG. 8 shows an embodiment a drain gun storing a plurality of cartridges according to this disclosure.

FIG. 4 shows an embodiment of a plurality of displays of a drain gun according to this disclosure. FIG. 5 shows an embodiment of a drain gun with a pressure gauge according to this disclosure. FIG. 6 shows an embodiment of a drain gun with a cover in an open position according to this disclosure. FIG. 7 shows an embodiment of a drain gun with a cover in a closed position according to this disclosure. FIG. 8 shows an embodiment a drain gun storing a plurality of cartridges according to this disclosure. In particular, the drain gun 100 (or the drain gun 200) hosts the plate 112 defining the openings for the displays 114. The openings can be of any shape (e.g. open-shaped, closed-shaped, symmetrical, asymmetrical, O-shape, D-shape, rectangle, square, oval, circle, triangle). Note that the openings are identical to each other in terms of type, shape, or structure. However, the openings can be non-identical to each other in terms of type, shape, or structure (and the handle 102 can be adapted for such variations).

The displays 114 can be positioned on any side of the handle 102 (e.g. top, bottom, lateral, front, rear). The displays 114 are analog, but can be digital (e.g. monochrome, color). For example, when the displays 114 are digital and when the handle 102 contains a battery (e.g. above cartridges, between cartridges, below cartridges), which can be single use, rechargeable, or replaceable, then the battery can power the displays 114. The displays 114 can output a content, such as a binary content (e.g. black/white, red/green, 1/0, full/empty) or a gradual content (e.g. counter, odometer, scale/range, red/yellow/green, full/half/empty), as further disclosed below. For example, the binary content or the gradual content can be seen in dark (e.g. backlight, phosphorescent). Note that the handle 102 has a lateral side that hosts the displays 114. For example, the handle 102 hosts the displays 114 above the covers 116. For example, the covers 116 can avoid hosting the displays 114. However, the displays 114 can be distributed among a plurality of sides (e.g. frontal, rear, lateral, top, bottom) of the handle 102 (e.g. opposite, adjacent). The displays 114 are identical to each other in terms of type, shape, weight, modality, or structure. However, the displays 114 can be non-identical to each other in terms of type, shape, weight, modality, or structure (and the handle 102 can be adapted for such variations).

The content is based on a plurality of pressure gauges 144 (e.g. analog, digital, manometers, pressure actuators, springs). The pressure gauges 144 are coupled (e.g. mechanically, fluidly, electrically, thermally, optically) to the displays 114 and the check valves 126. For example, the pressure gauges 144 can be positioned between the displays 114 and the check valves 126. For example, the pressure gauges 144 and the check valves 126 can be a pair of distinct units or a single unit (e.g. single housing, single chassis, single case, single frame). For example, the covers 116 can avoid hosting the pressure gauges 144. As such, the pressure gauges 144 monitor (e.g. read) at least some pressure of the cartridges 120 when the cartridges 120 are stored within the handle 102 and engage the pressure gauges 144 and the check valves 126, which can be through the nozzles 136. For example, the pressure gauges 144 can monitor at least some pressure of the cartridges 120 when the check valves 126 are not inputting at least some fluids from the cartridges 120 or outputting at least some fluids into the inlets 138, while the cartridges are within the nozzles 136 and engaging the check valves 126. Accordingly, when at least some pressure of the cartridges 120, as measured via the pressure gauges 144, reaches or satisfies or avoids reaching or avoids satisfying a predetermined or dynamic threshold (e.g. empty, half full, half empty, full), then the displays 114 can adjust accordingly or present accordingly. Note that the pressure gauges 144 are identical to each other in terms of type, shape, weight, modality, or structure. However, the pressure gauges 144 can be non-identical to each other in terms of type, shape, weight, modality, or structure (and the handle 102 can be adapted for such variations).

The handle 102 includes a plurality of shafts 146 (e.g. rectilinear, non-rectilinear, arcuate, sinusoidal) extending between the safety lock 110 and the barrel 106. The shafts 146 can include plastic, metal, or other materials. The shafts 146 are identical to each other in terms of type, shape, weight, volume, texture, or structure. However, the shafts 146 can be non-identical to each other in terms of type, shape, weight, volume, texture, or structure (and the handle 102 can be adapted for such variations). Note that although the shafts 146 corresponds to the covers 116 in a one-to-one correspondence, there can also be a single shaft 146 corresponding to the covers 116.

The handle 102 includes the covers 116 pivotally coupled to the shafts 146. Note that the covers 116 are identical to each other in terms of type, shape, weight, modality, or structure. However, the covers 116 can be non-identical to each other in terms of type, shape, weight, modality, or structure (and the handle 102 can be adapted for such variations). Although the covers 116 are pivotally coupled to the shafts 146, the shafts 146 can be omitted and the covers 116 fasten, mate, interlock, or snap onto the handle 102, yet still be pivotable relative to the handle 102 or removable from the handle 102. For example, the covers 116 can pivotally engage with the handle 102 via a plurality of C-shape snap end mounts.

The covers 116 host a plurality of tails 148 extending therefrom (e.g. assembly, unitary). The tails 148 are configured to engage with the latches 122. The tails 148 extend from the covers 116 such that a plurality of L-shapes is defined, although other shapes are possible (e.g. J-shape, V-shape). The tails 148 can engage with the latches 122 via mating, but other techniques are possible (e.g. interlock, magnetize, hook-and-loop, snap). Note that the tails 148 are identical to each other in terms of type, shape, weight, modality, or structure. However, the tails 148 can be non-identical to each other in terms of type, shape, weight, modality, or structure (and the handle 102 can be adapted for such variations).

The covers 116 host a plurality of ribs 150 extending therefrom (e.g. assembly, unitary). The ribs 150 are configured to support the cartridges 120. For example, the ribs 150 can freely support the cartridges 120 or couple (e.g. fasten, adhere, mate, interlock, magnetize, snap) to the cartridges 120. For example, the ribs 150 can mimic, accommodate, or structurally correspond to the bodies 130 (e.g. curved ribs 150 to curved bodies 130). The ribs 150 extend from the covers 116 between the shafts 146 and the tails 148 such that a plurality of L-shapes is defined, although other shapes are possible (e.g. J-shape, V-shape). Note that the ribs 150 are identical to each other in terms of type, shape, weight, modality, or structure. However, the ribs 150 can be non-identical to each other in terms of type, shape, weight, modality, or structure (and the handle 102 can be adapted for such variations).

The handle 102 contains a plurality of carriages 152. The carriages 152 are configured to host (e.g. support, hold) the cartridges 120 (e.g. freely, snugly, securely, mate, fasten, magnetize, adhere, interlock, snap). The carriages 152 can correspond to the cartridges 120 in a one-to-one manner, although a single carriage 152 can host the cartridges 120. When the covers 116 are closed, then the cartridges 120 are positioned between the carriages 152 and the covers 116. Note that the handle 102 contains a partition wall (e.g. solid, perforated) thereby defining a plurality of internal chambers of the drain gun 100 (or the drain gun 200), where the internal chambers contain the carriages 152 in a one-to-one correspondence. However, note that the partition wall can be omitted thereby enabling the drain gun 100 (or the drain gun 200) to have a single internal chamber containing the carriages 152.

As shown in FIGS. 5-8, the carriages 152 can be stationary within the handle 102 or mobile within the handle 102. For example, within the handle 102, the carriages 152 can travel toward the channel 134 and away from the latches 122, as shown in FIGS. 6-7. For example, within the handle 102, the carriages 152 can contact the nozzles 136 when moved toward the channel 134 and away from the latches 122 or the nozzles 136 can act as a plurality of movement stops for the carriages 152, as shown in FIG. 7. Likewise, within the handle 102, the carriages 152 can travel away from the channel 134 and toward the latches 122, as shown in FIGS. 6 and 8. As such, the carriages 152 can travel based on the covers 116 being opened or closed, as shown in FIGS. 6-8. For example, the carriages 152 can travel toward the channel 134 and away from the latches 122, as the covers 116 are being closed. For example, the carriages 152 can travel away from the channel 134 and toward the latches 122, as the covers 116 are being opened.

Within the handle 102, the carriages 152 can travel based on mechanical linkages, gears, bars, cables, springs, shape-memory materials, pulleys, hinges, cams, electric motors, actuators, or others. As such, the handle 102 can include a plurality of bars 156 coupled (e.g. mated, fastened, interlocked, magnetized, fastened) to the carriages 152 and to the covers 116, whether identically or non-identically. The bars 156 are U-shaped, but this shaping can vary (e.g. C-shape, L-shape, T-shape). Likewise, the covers 116 have a plurality of projections 158 (e.g. unitary, assembled, open-shaped, closed-shaped, symmetrical, asymmetrical, cam, circle, oval, square, rectangle, pentagon, octagon, triangle). The projections 158 are distal to the tails 148 and the ribs 150. Therefore, when the covers 116 are pivoted closed, the projections 158 engage the bars 156 and thereby pull (e.g. lift, urge) the carriages 152 to travel towards the channel 134 and away from the latches 122. Likewise, when the covers 116 are pivoted open, the projections 158 engage the bars 156 and thereby push (e.g. lower, urge) the carriages 152 to travel away from the channel 134 and towards the latches 122. Note that, whether additionally or alternatively, within the handle 102, the carriages 152 can travel towards the channel 134 and away from the latches 122 based on at least some urging, assistance, aid, help, movement, or guidance of the ribs 150 based on the ribs 150 being inserted, injected, or positioned between the latches 122 and the carriages 152, as shown in FIG. 7.

The carriages 152 are J-shaped, but this shaping can vary (e.g. L-shape, U-shape, C-shape, P-shape, T-shape). Note that at least one of the carriages 152 can include a lower base configured (e.g. sized, dimensioned) to host, support, or receive at least one of the necks 132 when that respective cartridge 120 is stored upside-down (e.g. storage, delay activation), where that respective body 130 is in proximity of that respective nozzle 136 (e.g. within about 2 inches) or not within that nozzle 136, yet stored within the handle 102 and hosted within that respective carriage 152, as shown in FIGS. 5 and 8. For example, the lower base can define an opening therein (e.g. open-shaped, closed-shape, symmetrical, asymmetrical, O-shape, D-shape, circle, square, triangle, rectangle, pentagon, octagon), where the opening is configured (e.g. sized, dimensioned) to receive that neck 132 extending therethrough, as shown in FIGS. 5 and 8. For example, the opening can match an external profile of that neck 132 in shape or be snug therewith. As such, the handle 102 can define an opening 154 (e.g. open-shaped, closed-shape, symmetrical, asymmetrical, O-shape, D-shape, circle, square, triangle, rectangle, pentagon, octagon) therethrough. The opening 154 can be configured (e.g. sized, dimensioned) to receive that neck 132 extending therethrough after that neck 132 extends through the opening of the lower base of that respective carriage 152. Note that the carriages 152 are identical to each other in terms of type, shape, weight, modality, range of travel, direction of travel, or structure. However, the carriages 152 can be non-identical to each other in terms of type, shape, weight, modality, range of travel, direction of travel, or structure (and the handle 102 can be adapted for such variations). Note that the handle 102 can avoid the carriages 152 as well.

Figure 9:
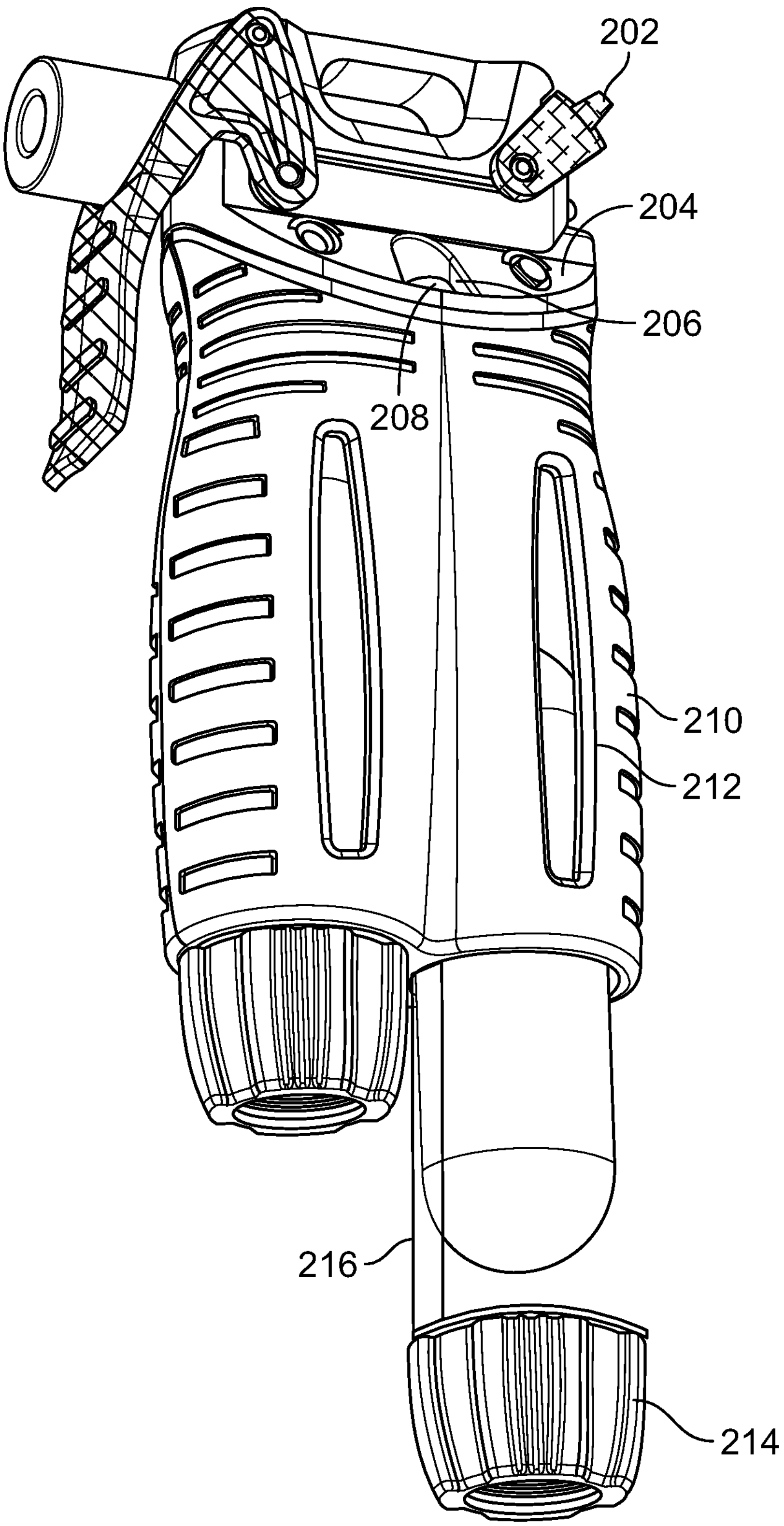
FIG. 9 shows an embodiment of a drain gun with a cap in an open position according to this disclosure.

FIG. 9 shows an embodiment of a drain gun with a cap in an open position according to this disclosure. In particular, the drain gun 200 is similar to the drain gun 100 except for various features disclosed below relative to FIG. 2.

The handle 210 hosts the caps 214 coupled (e.g. fastened, mated, snapped, interlocked) thereto. The caps 214 can include plastic, metal, rubber or other materials. The caps 214 are externally grooved, bumped, or knurled for grip enhancement, but can be externally smooth. The caps 214 can be of any shape (e.g. tubular, cylinder, dome, cuboid, cube, hemisphere, pyramid, cone). Note that the caps 214 are identical to each other in terms of type, shape, weight, or structure. However, the caps 214 can be non-identical to each other in terms of type, shape, weight, or structure (and the handle 210 can be adapted for such variations).

The caps 214 are tethered to the handle 210 via a plurality of lines 216 (e.g. tether, string, cable, chain, strap, rope, braid, bar, shaft, planar member). The lines 216 are coupled to the handle 210 (e.g. fasten, mate, interlock, adhere, magnetize, snap, hook-and-loop), whether identically or non-identically. The lines 216 are coupled to the caps 214 (e.g. fasten, mate, interlock, adhere, magnetize, snap, hook-and-loop), whether identically or non-identically. The lines 216 can include plastic, metal, rubber, or other materials, whether identical or non-identical to each other. The lines 216 can be rigid or flexible, whether identical or non-identical to each other. The lines 216 can retract into or out of the handle 210. For example, when retracted into the handle 210, the lines 216 can be positioned between the cartridges 120 stored within the handle 210 between the caps 214 and the channel 134. The lines 216 are sufficiently long to enable caps 214 to avoid interfering with the cartridges 120 being inserted into the handle 210 or being from the handle 210. As such, the cartridges 120 are inserted into the handle 210 or removed from the handle 210 (e.g. fall out, slide) when the caps 214 are not controlling access into the handle 210 or from the handle 210.

Figure 10:
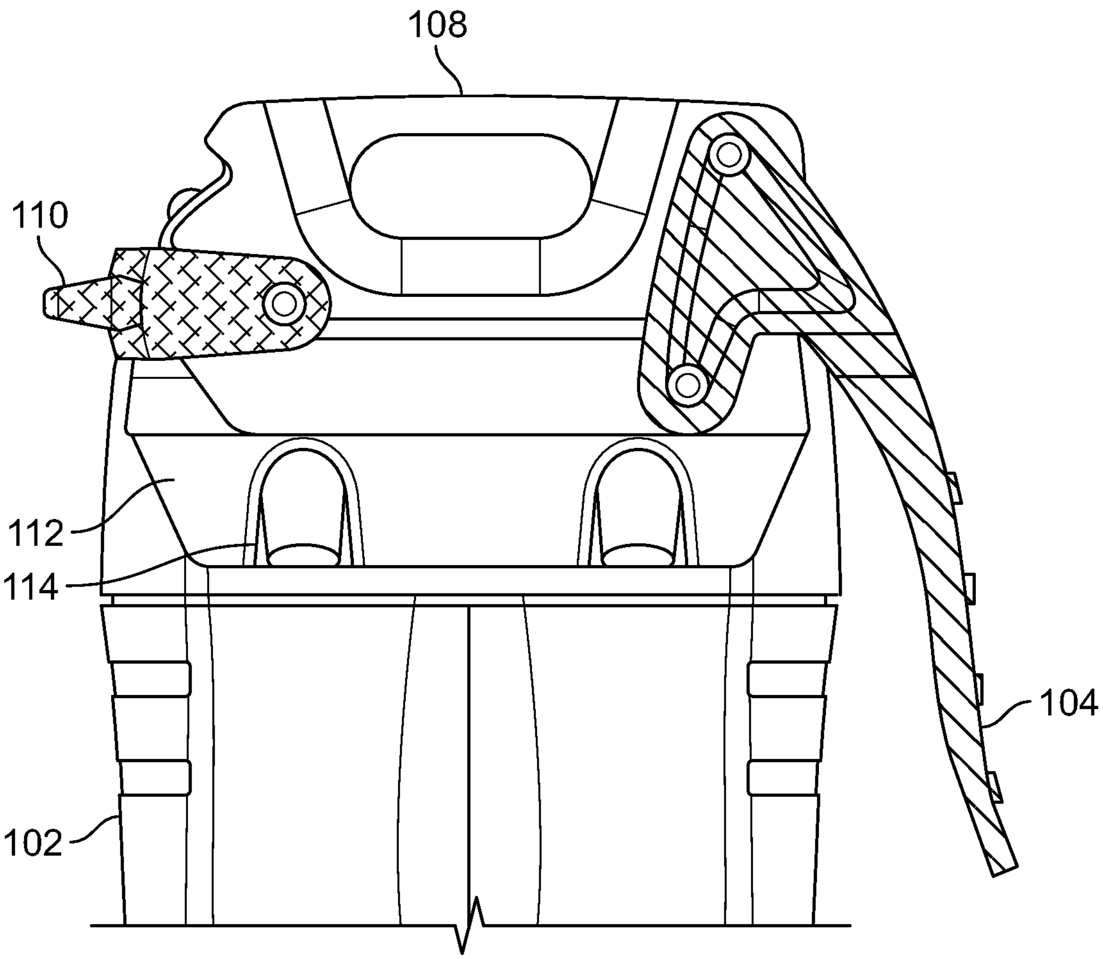
FIG. 10 shows an embodiment of a drain gun with an opening according to this disclosure.

FIG. 10 shows an embodiment of a drain gun with an opening according to this disclosure. In particular, the handle 102 defines the opening 108 (e.g. closed-shape, open-shaped, symmetrical, asymmetrical, O-shaped, D-shaped, rectangle, square, oval, circle, triangle) through which a strap, a hook (e.g. belt hook), or a carabiner can extend. The opening 108 extends between the trigger 104 and the safety lock 110.

Figure 11:
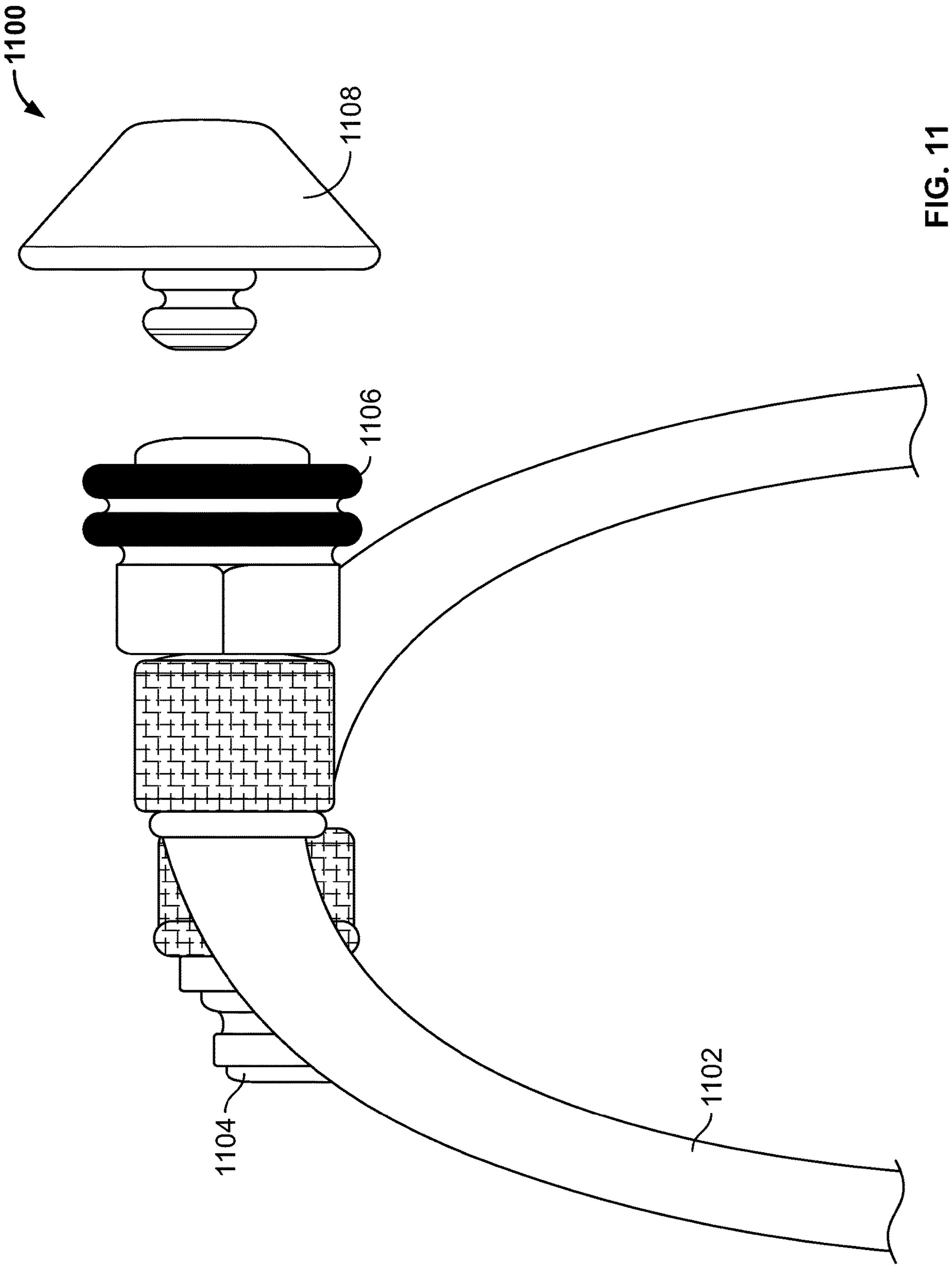
FIG. 11 shows an embodiment of a hose and a tip adapter for usage with a drain gun according to this disclosure.

FIG. 11 shows an embodiment of a hose and a tip adapter for usage with a drain gun according to this disclosure. In particular, a system 1100 includes a tube 1102 (e.g. plastic, metal, rubber, braided, armored, flexible, rigid, transparent, translucent, opaque, insulated, non-insulated) having a first end portion 1104 and a second end portion 1106. For example, the tube 1102 can be a hose that is flexible. The first end portion 1104 is configured for coupling to the barrel 106 (e.g. fastening, mating, interlocking, snapping, magnetizing, telescoping into/over). The second end portion 1106 is configured to couple (e.g. fastening, mating, interlocking, snapping, magnetizing, telescoping into/over) to a tip adapter 1108. The tip adapter 1108 is conical in order to fluidly engage with a drain line, which can vary in width. For example, the tip adapter 1108 can fluidly engage and form a seal with the drain line. As such, (1) the barrel 106 can couple to the first end portion 1104, (2) the tip adapter 1118 can couple to the second end portion 1106, and (3) the tip adapter 1118 can fluidly engage the drain line. Therefore, when the trigger 104 is pressed toward the handle 102, the drain gun 100 (or the drain gun 200) can perform a staged output of the fluids from the cartridges 120.

In one mode of operation, the drain gun 100 (or the drain gun 200) includes the handle 102 and the trigger 104. The handle 102 includes the channel 134 and the check valves 126. The check valves 126 feed the channel 134 and the trigger 104 causes the staged release of the fluids from the cartridges 120 to the channel 134 from the check valves 126 when the cartridges 120 are stored in the handle 102 and feeding the check valves 126. The handle 102 can include the pressure gauges 144 and the displays 114, where the displays 114 can present based on the pressure gauges 144. The pressure gauges 144 monitor the cartridges 120 when the cartridges 120 are stored in the handle 102 and engaging the check valves 126. The displays 114 can be analog and can present the gradual content or the binary content. The binary content can include a plurality of colors that are visually distinct from each other. The handle 102 can include a lateral side hosting the displays 114. The handle 102 can include the internal chambers. The lateral side can include the covers 116 controlling access to the internal chambers, where the internal chambers are sized to contain the cartridges 120. The pressure gauges 144 and the displays 114 can be not hosted via the covers 116. The handle 102 can host the carriages 152 configured to move toward the channel 134 as the covers 116 are being closed and where the carriages 152 are configured to host the cartridges 120. The carriages 152 can be configured to move away from the channel 134 as the covers 116 are being opened. The covers 116 can include the ribs 150 that engage the carriages 152 when the covers 116 are closed such that the carriages 152 are positioned between the ribs 150 and the channel 134. The handle 210 can include the internal chambers, where the handle 210 hosts caps 214 controlling access to the internal chambers and where the internal chambers are positioned between the channel 134 and the caps 214 and where the internal chambers are sized to contain the cartridges 120. The caps 214 can thread onto the handle 210 and can be coupled to the handle 210 via the lines 216, where the lines 216 are configured to recede into handle 210 when the caps 214 contact the handle 210. The handle 102 can define 108 the opening sized for engaging with at least one of a strap, a belt hook, or a carabiner, wherein the channel 134 is positioned between the opening 108 and the check valves 126. The staged release can include a plurality of stages, wherein the trigger 104 can provides a haptic output that at least one of the stages is reached. The handle 102 can include the covers 116, where the handle 102 includes the internal chambers to which the covers 116 control access, where the internal chambers are sized to contain the cartridges 120. The handle 102 can host the carriages 152, where the carriages 152 are configured to move toward the channel 134 as the covers 116 are being closed and where the carriages 152 are configured to host the cartridges 120. The covers 116 can include the ribs 150 that engage the carriages 152 when the covers 116 are closed such that the carriages 152 are positioned between the ribs 150 and the check valves 126. The handle 102 can host the carriages 152 where the carriages 152 are configured to move away from the channel 134 as the covers 116 are being opened and where the carriages 152 are configured to host the cartridges 120. The handle 210 can include the internal chambers, where the handle 210 can host the caps 216 controlling access to the internal chambers and where the internal chambers are positioned between the channel 134 and the caps 214 and where the internal chambers are sized to contain the cartridges 120. The caps 214 can thread onto the handle 210 and the caps 214 can be coupled to the handle via the lines 216 and the lines 216 can be configured to recede into handle 210 when the caps 214 contact the handle 210. The fluids from the cartridges 120 can define a full capacity of the cartridges 120, where the full capacity is dispensed at once when the trigger 104 is pulled to a full stroke. The handle 102 can include the safety lock 110 that prevents an unintended discharge of the staged release. The handle 102 can be configured to store at least one of the cartridges 120 without puncturing or piercing (e.g. seal, cap, neck, top, sidewall) the at least one of the cartridges 120 and while the at least one of the cartridges 120 is not engaging the check valves 126. For example, a method can comprise: coupling the drain gun 100 (or the drain gun 200) to a drain line that is clogged. The drain gun 100 (or the drain gun 200) can host the cartridges 120 storing the fluids. The method can comprise outputting the fluids from the drain gun 100 (or the drain gun 200) controllably in stages such that the drain line is unclogged via the fluids.

FIGS. 12*a*-12*d* show a plurality of embodiments of a plurality of accessories that can be used with a drain gun according to this disclosure. In particular, an inflatable tip adapter 1200 includes a coupling portion 1202 and an insertion portion 1204. The insertion portion 1204 is assembled with the coupling portion 1202 (e.g. fastened, mated, interlocked, adhered, magnetized, nested, mounted, friction engaged, clamped), but can be unitary therewith (e.g. single piece inclusive of same material). The coupling portion 1204 has or avoids having a material (e.g. plastic, metal, rubber, polyvinyl chloride (PVC), rigid, flexible, opaque, transparent, translucent) in common with the insertion portion 1204.

The coupling portion 1202 includes an end portion 1206 (e.g. plastic, metal, rubber) configured for coupling to the drain gun 100 or the drain gun 200 or the tube 1102 or the tip adapter 1108 or a tip adapter 1216 (e.g. mechanically, fluidly, mated, interlocked, adhered, magnetized, nested, mounted, friction engaged, clamped). For example, the drain gun 100 or the drain gun 200 can be directly coupled to the end portion 1206 via threading thereunto (e.g. barrel 106) such that the barrel 106 is in fluid communication with the end portion 1206. For example, the drain gun 100 or the drain 200 can be indirectly coupled the end portion 1206 via the tube 1102 where the tube 1102 is in fluid communication with the barrel 106 on the first end portion 1104 at one end thereof (e.g. mechanical coupling, fastened, mated, interlocked, adhered, magnetized, nested, mounted, friction engaged, clamped) and in fluid communication with the end portion 1206 on the second end portion 1106 on opposing end thereof (e.g. mechanical coupling, fastened, mated, interlocked, adhered, magnetized, nested, mounted, friction engaged, clamped).

Figure 12A:
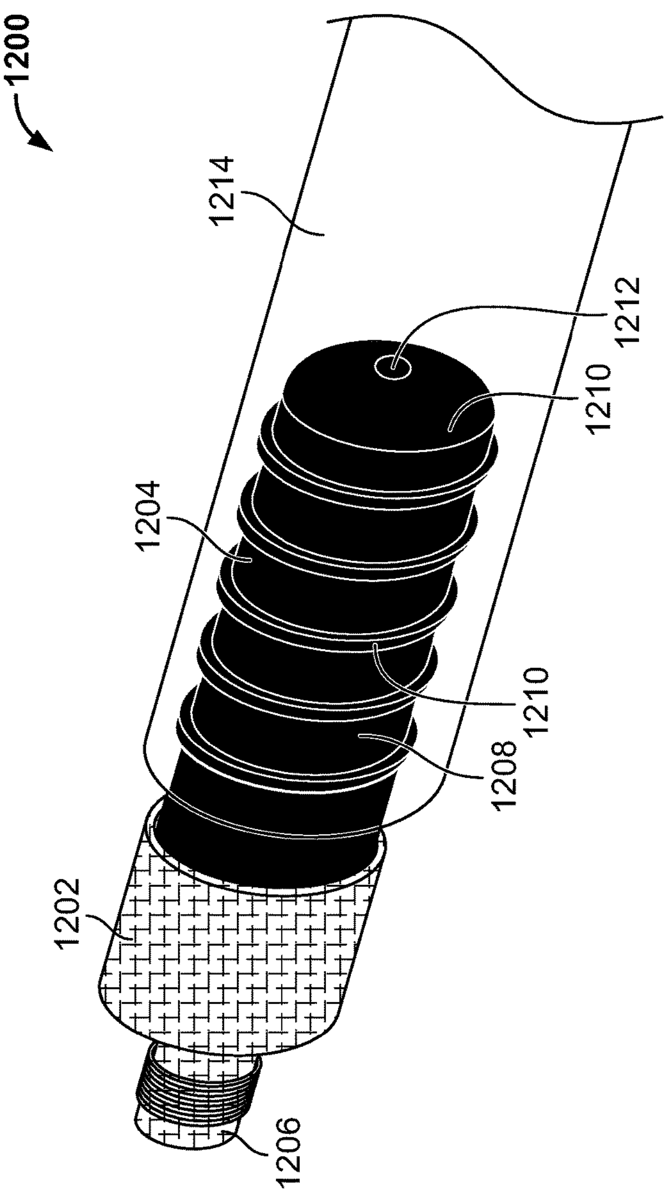
FIGS. 12*a*-12*d* show a plurality of embodiments of a plurality of accessories that can be used with a drain gun according to this disclosure.
Figure 12B:
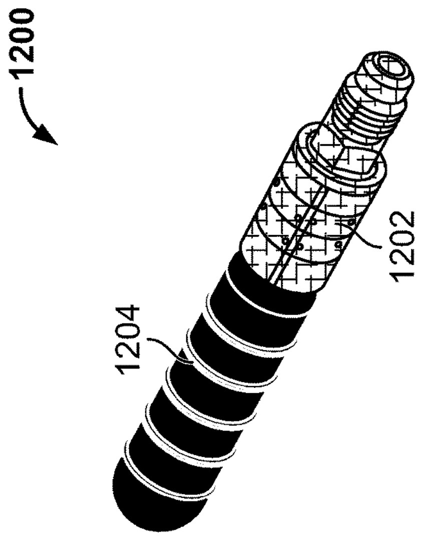
Figure 12C:
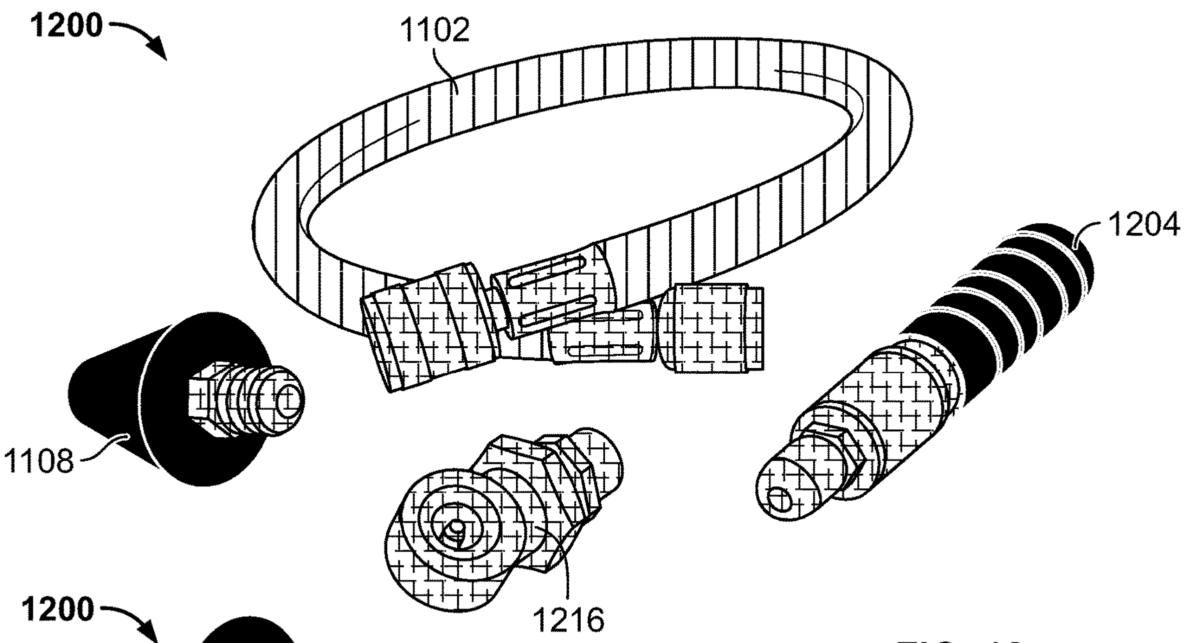
Figure 12D:
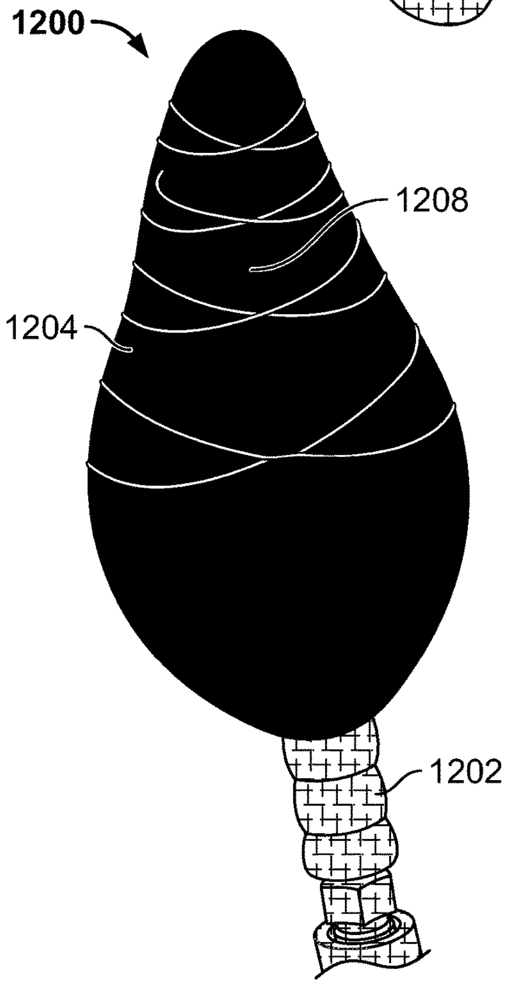

The insertion portion 1204 includes an inflatable portion 1208 (e.g. rubber, latex, elastomeric, shape memory) that longitudinally and cylindrically (e.g. rectilinear, arcuate, sinusoidal) extends in a direction (e.g. opposite, perpendicular, acute, obtuse) away from the end portion 1206. The inflatable portion 1208 has a round lateral cross-section, but other lateral cross-sections are possible (e.g. square, rectangle, triangle, octagon, pentagon, D-shape, closed-shape, open-shape, symmetrical, asymmetrical). As shown in FIG. 12*b*, the inflatable portion 1208 is at a deflated state. As shown in FIG. 12*d*, the inflatable portion 1208 is at an inflated state.

The inflatable portion 1208 includes a plurality of ridges 1210 (e.g. solid walls, perforated walls) circumferentially extending along the inflatable portion 1208 and are spaced apart from each other along the inflatable portion 1208. Note that the inflatable portion 1208 can host at least one of the ridges 1210 or two or more of the ridges 1210, whether identical or non-identical to each other in shape, structure, material, properties, or others. The ridges 1210 can be extend perpendicular to the inflatable portion 1208 or non-perpendicular to the inflatable portion 1208 (e.g. acute, obtuse). The ridges 1210 can be solid lines (e.g. uniform height, variable height) or broken lines (e.g. uniform height, variable height). The ridges 1210 can intersect, face, or overlap each other or avoid intersecting, facing, or overlapping each other, whether the inflatable portion 1208 is inflated or not. This spacing can be equal (e.g. parallel) or unequal (e.g. non-parallel), whether the inflatable portion 1208 is inflated or not. Note that the ridges 1210 can extend helically, spiral, or coil about or along the inflatable portion 1208, whether the inflatable portion 1208 is inflated or not. The ridges 1210 are longitudinally circular, but other shapes are possible (e.g. oval, square, triangle, octagon, pentagon, D-shape, open-shape, closed-shape, symmetrical, asymmetrical). The ridges 1210 are unitary with the inflatable portion 1208 (e.g. single piece inclusive of same material), but can be assembled therewith (e.g. mechanical coupling, fastened, mated, interlocked, adhered, magnetized, nested, mounted, friction engaged, clamped) or can include at least some material different from the inflatable portion 1208.

The inflatable portion 1208 includes an end portion 1210 distal from and opposing the end portion 1206. The end portion 1210 projects outward away from the end portion 1206 (e.g. dome-shaped, conical, pyramidal), but can be planar or dimple inward toward the end portion 1206 (e.g. depression, well). The end portion 1210 is substantially closed (e.g. at least 50.1%, 51%, 66%, 75%, 80%, 85%, 90%, 95%, 97%, 99%) except for defining an opening 1212, which can be positioned at a leading edge (e.g. rounded, pointed) thereof when the leading edge is present. Note that the opening 1212 is circular, but can be shaped differently (e.g. slit, oval, square, triangle, octagon, pentagon, D-shape, open-shape, closed-shape, symmetrical, asymmetrical). For example, the opening can be an elongated slit, a closed-shape slit, a circular slit, a crescent shape slit, or others. For example, the end portion 1210 can includes a set of openings 1212 (e.g. at least two, three, four, five, six, seven, eight, nine, ten, twenty) distributed thereabout (e.g. salt-shaker style), whether randomly or according to a pattern (e.g. star, alphanumeric character, logo, character).

The inflatable tip adapter 1200 is inserted into an open end of a tube 1214 (e.g. plastic, metal, rubber, PVC, rigid, flexible, opaque, transparent, translucent) such that the inflatable portion 1208 is substantially within the tube 1214 (e.g. at least 50.1%, 51%, 66%, 75%, 80%, 85%, 90%, 95%, 97%, 99%, 100%) or until the open end of the tube 1214 engages (e.g. contacts) the coupling portion 1202. For example, the tube 1214 is a drain line or is fluidly associated with a drain line. When the inflatable portion 1208 is within the tube 1214 and the tube 1214 has an inner surface (e.g. smooth, rough, knurled), the ridges 1210 contact or avoid contacting the inner surface 1214. As such, at least one of the ridges 1210 can create a seal, which can be hermetic, with the inner surface of the tube 1214. Note that at least some gas (e.g. air) can remain between the ridges 1210, the inner surface of the tube 1214, and the inflatable portion 1208.

In one mode of operation, the inflatable tip adapter 1200 has the inflatable portion 1208 that is inserted into the open end of the tube 1214. When the drain gun 100 or the drain 200 output the fluids (e.g. gas, liquid) therefrom, the inflatable tip portion 1208 expands and thereby seals via at least one of the ridges 1210, whether contacting or avoiding contact with the inner surface of the tube 1214, and grips via at least one of the ridges 1210 against the inner surface of the tube 1214, which prevents the inflatable tip adapter 1200 from slipping out from the tube 1214. The opening 1212 allows at least some of the fluids (e.g. gas. liquid) to proceed through the tube 1214 and unclog the tube 1214 downstream. For example, the coupling portion 1202 can be connected to the barrel 106 or the second end portion 1106 (with the first end portion 1104 being fluidly connected to the barrel 106) of the tube 1102. The insertion portion 1204 inserted into the open end of the tube 1214. Then, the drain gun 100 or the drain gun 200 can dispense the fluids (e.g. gas, liquid) therefrom. During this dispensation, the inflatable portion 1208 is inflated and causes at least some of the ridges 1210 to create a seal against the inner surface of the tube 1214. The seal enables at least some pressure to build on the end portion 1210 and thereby outputting the fluids from the opening 1212 and pushing at least some clog materials through and out of the tube 1214.

Figure 13:
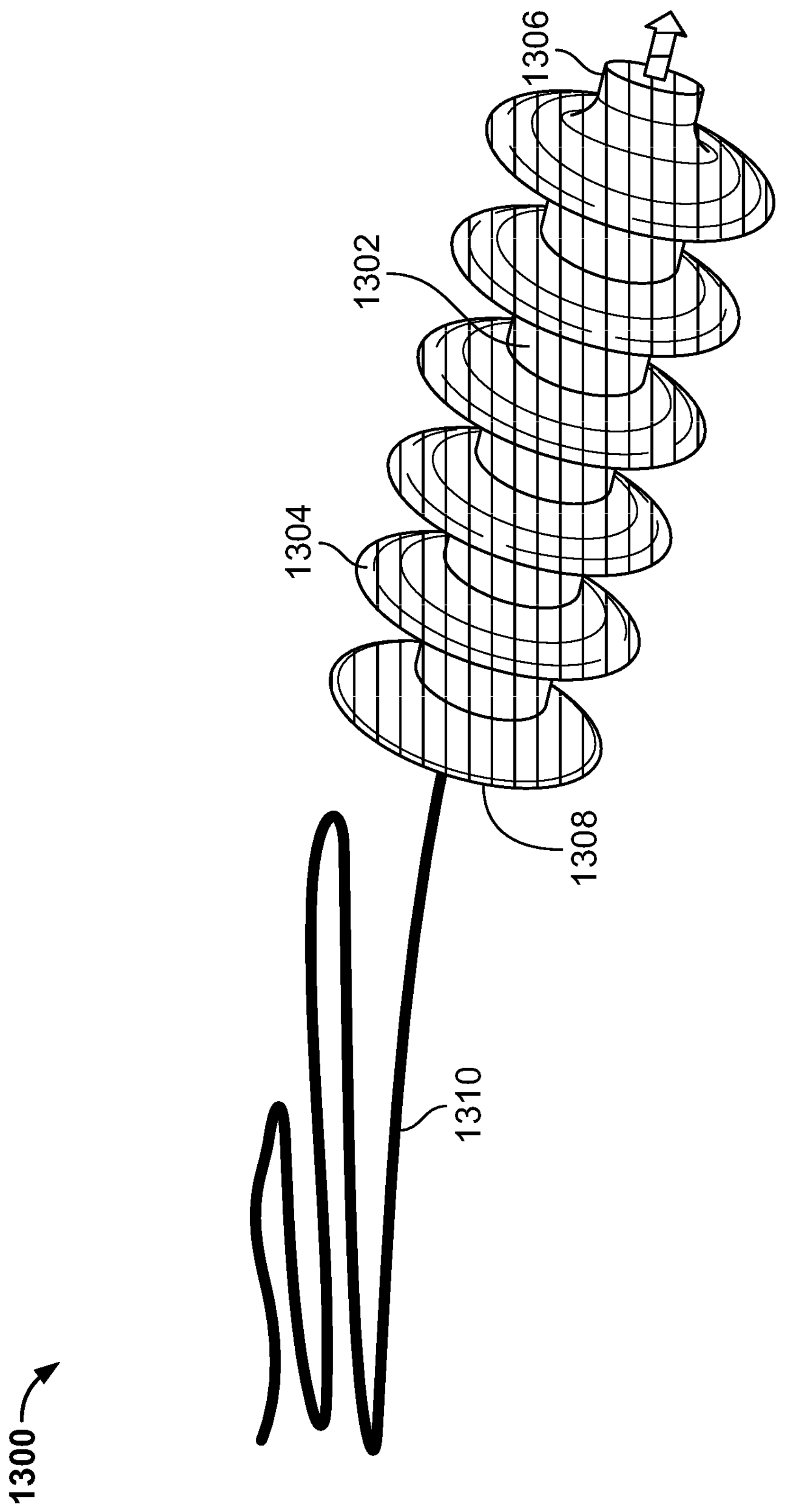
FIG. 13 shows an embodiment of a shuttle that can be used with a drain gun according to this disclosure.

FIG. 13 shows an embodiment of a shuttle that can be used with a drain gun according to this disclosure. In particular, a shuttle 1300 includes a body 1302 that hosts a plurality of ridges 1304. The shuttle 1300, inclusive of the body 1302 and the ridges 1304, can include a material that includes or can be plastic, metal, rubber, latex, elastomeric material, PVC, rigid, flexible, opaque, transparent, translucent, or others. For example, the shuttle 1300 can be embodied as a tube plug.

The body 1302 includes a leading end portion 1306 and a trailing end portion 1308. The body 1302 is longitudinally elongated (e.g. rectilinear, arcuate, sinusoidal) between the leading end portion 1306 and the trailing end portion 1308. The body 1302 can be internally hollow between the leading end portion 1306 and the trailing end portion 1308 or internally solid between the leading end portion 1306 and the trailing end portion 1308. The body 1302 can include an internal channel (e.g. rectilinear, arcuate, sinusoidal)

between the leading end portion 1306 and the trailing end portion 1308. The body 1302 can be inflatable (e.g. gas, liquid) or non-inflatable.

The ridges 1304 (e.g. solid walls, perforated walls) are circumferentially extending along the body 1302 and are spaced apart from each other along the body 1302. Note that the body 1302 can host at least one of the ridges 1304 or two or more of the ridges 1304, whether identical or non-identical to each other in shape, structure, material, properties, or others. The ridges 1304 can be extend perpendicular to the body 1302 or non-perpendicular to the body 1302 (e.g. acute, obtuse). The ridges 1304 can be solid lines (e.g. uniform height, variable height) or broken lines (e.g. uniform height, variable height). The ridges 1304 can intersect, face, or overlap each other or avoid intersecting, facing, or overlapping each other, whether the body 1302 is inflated or not. This spacing can be equal (e.g. parallel) or unequal (e.g. non-parallel), whether the body 1302 is inflated or not. Note that the ridges 1304 can extend helically, spiral, or coil about or along the body 1302, whether the body 1302 is inflated or not. The ridges 1304 are longitudinally circular, but other shapes are possible (e.g. oval, square, triangle, octagon, pentagon, D-shape, open-shape, closed-shape, symmetrical, asymmetrical). The ridges 1304 are unitary with the body 1302 (e.g. single piece inclusive of same material), but can be assembled therewith (e.g. mechanical coupling, fastened, mated, interlocked, adhered, magnetized, nested, mounted, friction engaged, clamped). The trailing end portion 1308 is coupled (e.g. fastened, mated, interlocked, adhered, bonded, looped, stitched, weaved, magnetized, injected, tied) to a leading end portion of a line 1310 (e.g. tether, rope, cable, chain, rod, plunger, string, braid, planar extension, X-shaped extension, helical extension, coiled extension, spiral extension, stretchable extension, resilient extension, elastic extension, rigid extension). The line 1310 has a trailing end portion that can be coupled (e.g. fastened, mated, interlocked, adhered, bonded, looped, stitched, weaved, magnetized, injected, tied) to the drain gun 100 (e.g. barrel 106, handle 102) or the drain gun 200 (e.g. barrel 106, handle 102) or another device (e.g. stationary, mobile, drain gun end effector, hose, fixture, furniture, appliance, tube, air handler, building floor) or be manually held (e.g. arm, finger, palm, garment).

In one mode of operation, the shuttle 1300 is inserted into an open end (e.g. inlet) of a drain line having an inner surface (e.g. smooth, rough, knurled) such that the ridges 1304 contact or avoid contact with the inner surface of the drain line and the shuttle 1300 can be propelled therethrough via the fluids sourced from the drain gun 100 or the drain gun 200, yet still be recoverable from within the drain line via pulling on the line 1310, whether this pulling is manual or automatic (e.g. motor, actuator, reel). This form of travel can clear at least some obstructions of the drain line. For example, the shuttle 1300 can be inserted into the open end of the drain line, whether with the line 1310 or without the line 1310, such that the ridges 1304 face the inner surface of the drain line. Resultantly, the line 1310 trails the body 1302. Then, when the drain gun 100 or the drain 200 outputs the fluids (e.g. gas, liquid) therefrom, the shuttle 1300 is propelled within the drain line and away from the open end of the drain line. The ridges 1304 can contact or avoid contacting the inner surface of the drain line. The leading end portion 1306, the body 1302, or at least some of the ridges 1304 can exert a positive force (e.g. pressure) onto a clog within the drain line and can mechanically loosen or push the clog longitudinally along the drain line, which can include to an outlet thereof. Then, the line 1310 can be pulled or retracted from the open end of the drain line (e.g. fishing style) such that the body 1302 can be retrieved from the open end of the drain line from which the body 1302 was launched. Alternatively, the body 1302 can be retrieved from the outlet of the drain line, whether with the line 1310 or without the line 1310, which can depend on how the body 1302 was launched.

Figure 14A:
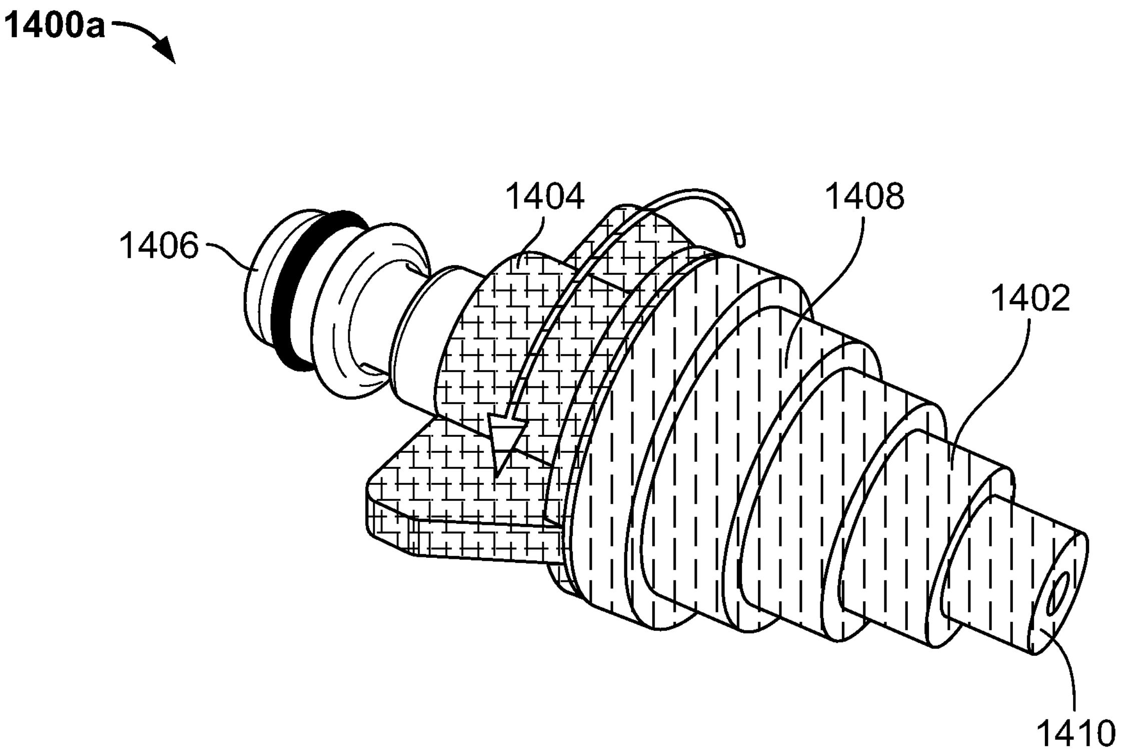
FIGS. 14*a*-14*e* show a plurality of embodiments of a plurality of expanding-grip stepped plugs that can be used with a drain gun according to this disclosure.

FIGS. **14*a*-14*e* show a plurality of embodiments of a plurality of expanding-grip stepped plugs that can be used with a drain gun according to this disclosure. In particular, as shown in FIG. 14*a*, an expanding-grip stepped plug 1400*a* includes a stepped section 1402, a wingnut section 1404, and a fitting section 1406**.

The stepped section 1402 includes a plurality of tubular members 1408 that are concentric with each other and progressively and longitudinally step-down away from the wingnut section 1404 (e.g. decrease in outer diameter, decrease in outer perimeter, decrease in inner diameter, decrease in inner perimeter) in order to fit various drain line inner diameter sizes. The stepped section 1402 contains an inner channel (e.g. open-shape, closed-shape, symmetrical, asymmetrical, square, rectangular, triangular, pentagon, octagonal, star, uniform internal width, varying internal width, tapered internal width) centrally extending through the tubular members 1408. The stepped section 1402 includes an open end portion 1410 defining an opening (e.g. open-shape, closed-shape, symmetrical, asymmetrical, square, rectangular, triangular, pentagon, octagonal, star) in fluid communication with the inner channel.

The tubular members 1408 are circular, but this shaping can vary (e.g. open-shape, closed-shape, symmetrical, asymmetrical, square, rectangular, triangular, pentagon, octagonal, star). The tubular members 1408 are identical to each other in shape, but differ from each other in size (e.g. stepped). However, some of the tubular members 1408 can differ in shape from each other as well (e.g. circle and oval). The tubular members 1408 have smooth outer surfaces, but this can vary (e.g. rough, knurled, projections, bumps, depressions). The tubular members 1408 are unitary with each other (e.g. single piece inclusive of same material), but can be assembled with each other (e.g. adhering, magnetizing, interlocking, fastening, mating, bonding). The tubular members 1408 can include an elastic, elastomeric, flexible, or shape memory material (e.g. polymer, plastic, rubber, latex, silicon, nitinol).

The wingnut section 1404 includes a wingnut with a plurality of wings external to the stepped section 1402 and positioned between the tubular members 1408 and the fitting section 1406. The wings are outwardly tapered, but this can vary (e.g. wings inwardly taper, wings do not taper). The wingnut section 1404 has an inner channel (e.g. open-shape, closed-shape, symmetrical, asymmetrical, square, rectangular, triangular, pentagon, octagonal, star, uniform internal width, varying internal width, tapered internal width) centrally extending therethrough and in fluid communication with the inner channel of the stepped section 1402. The wingnut section 1404 can be rigid or flexible or differ from the stepped section 1406 in material (e.g. plastic, metal, rubber, PVC, rigid, flexible, opaque, transparent, translucent). The inner channel of the stepped section 1402 and the inner channel of the wingnut section 1404 can be co-aligned along a common axis and the wingnut with the wings can be rotated clockwise or counterclockwise about the common axis.

The fitting section 1406 (e.g. plastic, metal, rubber, latex, shape-memory, elastomeric, PVC, rigid, flexible, opaque, transparent, translucent) includes an open end portion configured to fluidly couple (e.g. fasten, mate, interlock, magnetize, adhere) to the drain gun 100 or the drain gun 200 or the tube 1102 or the tip adapter 1108. The fitting section 1406 can be rigid, elastic, resilient, shape memory, or flexible, whether rectilinear or non-rectilinear. For example, the fitting section 1406 can be rigid or shaped in various ways (e.g. I-shape, L-shape, J-shape, S-shape, T-shape, plus-shape, X-shape). For example, the fitting section 1406 can bend between about 0 degrees and about 180 degrees (e.g. living hinge, drinking straw-type hinge) in a single direction or among a plurality of directions. For example, the fitting section 1406 can bend between about 0 degrees and about or less than 170, 160, 150, 140, 130, 120, 110, 100, 90, 80, 70, 60, 50, 40, 30, 20, 10, or 5 degrees in a single direction or among a plurality of directions. The fitting section 1406 includes an inner channel (e.g. open-shape, closed-shape, symmetrical, asymmetrical, square, rectangular, triangular, pentagon, octagonal, star, uniform internal width, varying internal width, tapered internal width) extending therethrough. The inner channel of the fitting section 1406 and the inner channel of the wingnut section 1404 or the stepped section 1402 can be co-aligned along a common axis. Alternatively, the inner channel of the fitting section 1406 can extend through the wingnut section 1404 and the stepped section 1402 (e.g. wingnut section 1404 and stepped section 1402 envelop, extend about, or mounted onto fitting section 1406). For example, the wingnut section 1404 can be mounted over (e.g. adhered, bonded) the inner channel of the fitting section 1406 and the inner channel of the fitting section 1406 can be extending through the inner channel of the wingnut section 1404. Likewise, the stepped section 1402 can be mounted over (e.g. adhered, bonded) the inner channel of the fitting section 1406 and the inner channel of the fitting section 1406 can be extending through the inner channel of the stepped section 1402.

In one mode of operation, the stepped section 1402 is inserted into an open end (e.g. inlet) of a drain line (e.g. rigid tube, flexible tube) having an inner surface such that the opening of the open end 1410 is in fluid communication with the drain line and at least some of the tubular members 1408 face, contact, or snug against the inner surface. For example, the stepped section 1402 can be inserted up to a nearest matching drain line inner diameter size. At that point, the wingnut section 1404 can be rotated clockwise or counterclockwise (e.g. fastened) such that at least one of the tubular members 1408 (e.g. matching to drain line inner diameter size) can be outwardly expanded to contact, grip, or seal, which can be hermetic, against the inner surface of the drain line. Therefore, the stepped section 1402 can be inserted into the open end of the drain line when the drain line is clogged. The wingnut section 1404 can be fastened such that at least one of the tubular members 1408 (e.g. matching to drain line inner diameter size) can be outwardly expanded to contact, grip, or seal, which can be hermetic, against the inner surface of the drain line. The drain gun 100 or the drain gun 200 or the tube 1102 or the tip adapter 1108 can be fluidly coupled (e.g. fastened, mated, interlocked) to the fitting section 1406 such the at least one of the cartridges can source at least one of the fluids through the fitting section 1406, the wingnut section 1404, and the stepped section 1402 into the drain line and thereby at least partially unclog the drain line.

Figure 14C:
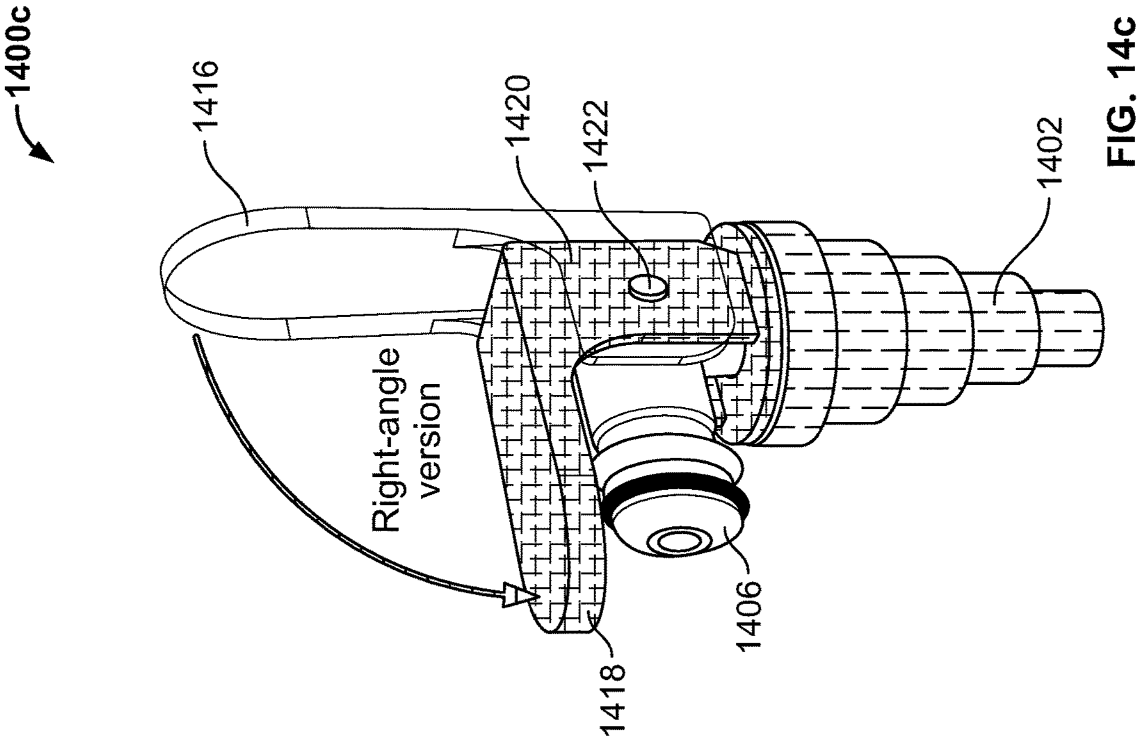
Figure 14B:
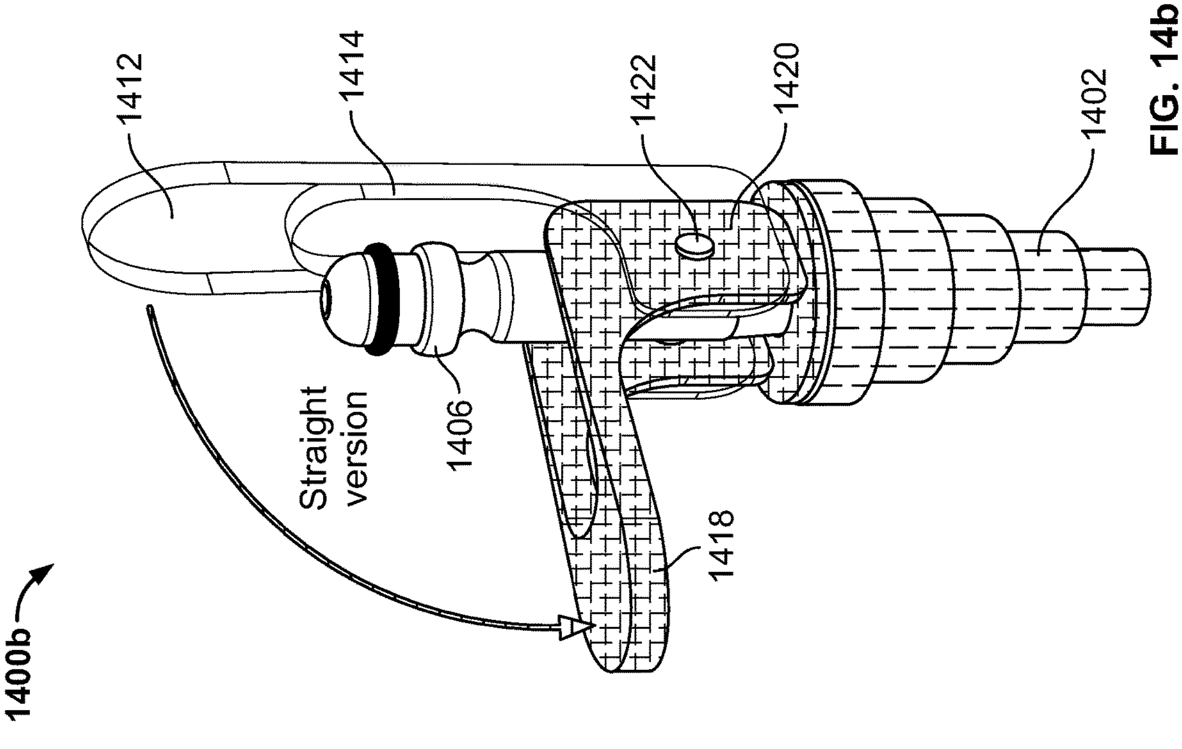

As shown in FIG. **14*b* and FIG. 14*c*, an expanding-grip stepped plug 1400*b* includes the stepped section 1402 and the fitting section 1406 and an expanding-grip stepped plug 1400*c* includes the stepped section 1402 and the fitting section 1406. However, the expanding-grip stepped plug 1400*b* and the expanding-grip stepped plug 1400*c* differ from the expanding-grip stepped plug 1400*a* by having a cam lever 1412 and a cam lever 1416**, respectively.

As shown in FIG. **14*b*, the cam lever 1412 is shaped in an L-shape, as defined via a base 1420 and a column 1418. However, note that the cam lever 1412 can be shaped differently (e.g. J-shape, C-shape, U-shape). The cam lever 1412 also includes a pivot 1422 (e.g. rectilinear, arcuate, sinusoidal) extending from the fitting section 1406 into the base 1420 or vice versa. The pivot 1422 can be flush with the base 1420 or extend past the base 1420. The pivot 1422 can be unitary with the fitting section 1406 (e.g. single piece inclusive of same material) or the pivot 1422 can be assembled with the fitting section 1406 (e.g. fastened, mated, interlocked, adhered, magnetized, bonded). Alternatively, the pivot 1422 can be unitary with the base 1420 (e.g. single piece inclusive of same material) or the pivot 1422 can be assembled with the base 1420 (e.g. fastened, mater, interlocked, adhered, magnetized, bonded). The column 1418 defines an internal opening 1414 structured such that the fitting section 1406 fits therethrough, without bending, when the cam lever 1412 is rotated about 90 degrees about the pivot 1422. For example, the opening 1418 can be rectangular, oval, L-shaped, or others. Note that the fitting section 1406** can be rigid or flexible.

As shown in FIG. **14*c*, the expanding-grip stepped plug 1400*c* differs from the expanding-grip stepped plug 1400*b* by the fitting section 1406 being L-shaped or bendable or flexible or resilient or elastic and the expanding-grip stepped plug 1400*c* having the cam lever 1416 being equipped with the column 1418 lacking the opening 1414 (e.g. solid), although the column 1418 can be perforated or latticed. As such, the fitting section 1406 remains L-shaped, while the cam lever 1416 is pivoted about the pivot 1422. For example, the fitting section 1406 being L-shaped can be useful in tight spaces. Note that the fitting section 1406 can be configured such that a hose or an adapter fluidly coupled thereto distal from the stepped section 1402 can clear the fitting section 1406 regardless of positioning of the cam lever 1412 or the cam lever 1416. For example, the hose or the adapter may need not be fluidly connected to the fitting section 1406, while the cam lever 1412 is pivoted about the pivot 1422. Alternatively, the fitting section 1406 is bendable or flexible or resilient or elastic and therefore correspondingly bends or flexes, as being urged by the column 1418, when the cam lever 1416 is pivoted about the pivot 1422**.

In one mode of operation, the stepped section 1402 is inserted into an open end (e.g. inlet) of a drain line (e.g. rigid tube, flexible tube) having an inner surface such that the opening of the open end 1410 is in fluid communication with the drain line and at least some of the tubular members 1408 face, contact, or snug against the inner surface. For example, the stepped section 1402 can be inserted up to a nearest matching drain line inner diameter size. At that point, the cam lever 1412 or the cam lever 1416 can be pivoted clockwise or counterclockwise (e.g. fastened) about the pivot 1422 such that at least one of the tubular members 1408 (e.g. matching to drain line inner diameter size) can be outwardly expanded to contact, grip, or seal, which can be hermetic, against the inner surface of the drain line. Therefore, the stepped section 1402 can be inserted into the open end of the drain line when the drain line is clogged. The cam lever 1412 or the cam lever 1416 can be rotated (e.g. fastened) such that at least one of the tubular members 1408 (e.g. matching to drain line inner diameter size) can be outwardly expanded to contact, grip, or seal, which can be hermetic, against the inner surface of the drain line. The drain gun 100 or the drain gun 200 or the tube 1102 or the tip adapter 1108 can be fluidly coupled (e.g. fastened, mated, interlocked) to the fitting section 1406 such the at least one of the cartridges can source at least one of the fluids through the fitting section 1406 and the stepped section 1402 into the drain line and thereby at least partially unclog the drain line.

Figure 14D:
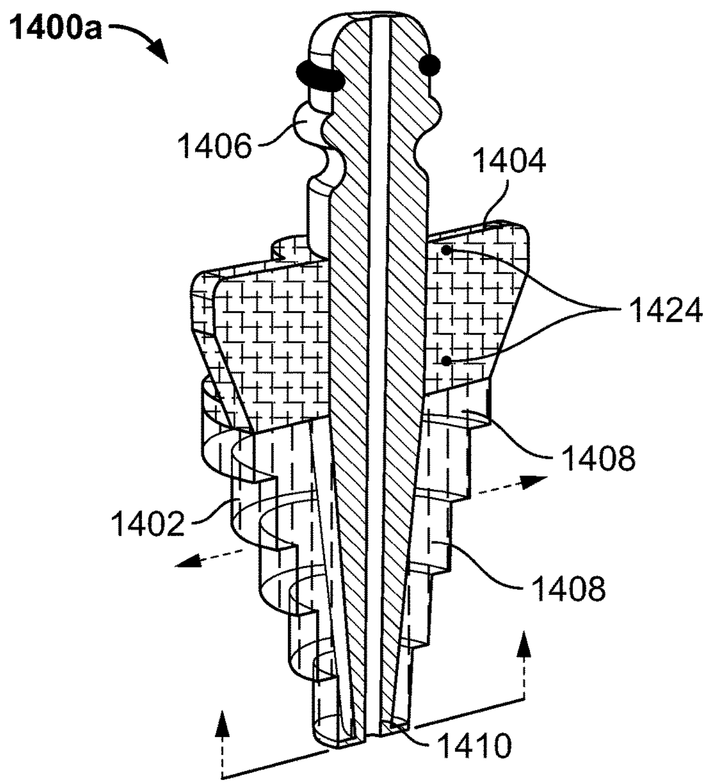

As shown in FIG. 14*d*, the expanding-grip stepped plug 1400*a* includes the fitting section 1406 longitudinally and concentrically extending through the wingnut section 1404 and the stepped section 1402 along a common axis. In the stepped section 1402, the fitting section 1406 extends through the tubular members 1408. As such, since the fitting section 106 has a flange at an end thereof, when the wingnut is rotated via the wings about the common axis, whether clockwise or counterclockwise, the flange translates this rotation thereby compressing and outwardly expanding the stepped section 1402 (e.g. tubular members 1408) against the inner surface of the drain line such that the stepped section 1402 can create the seal against the inner surface of the drain line.

Figure 14E:
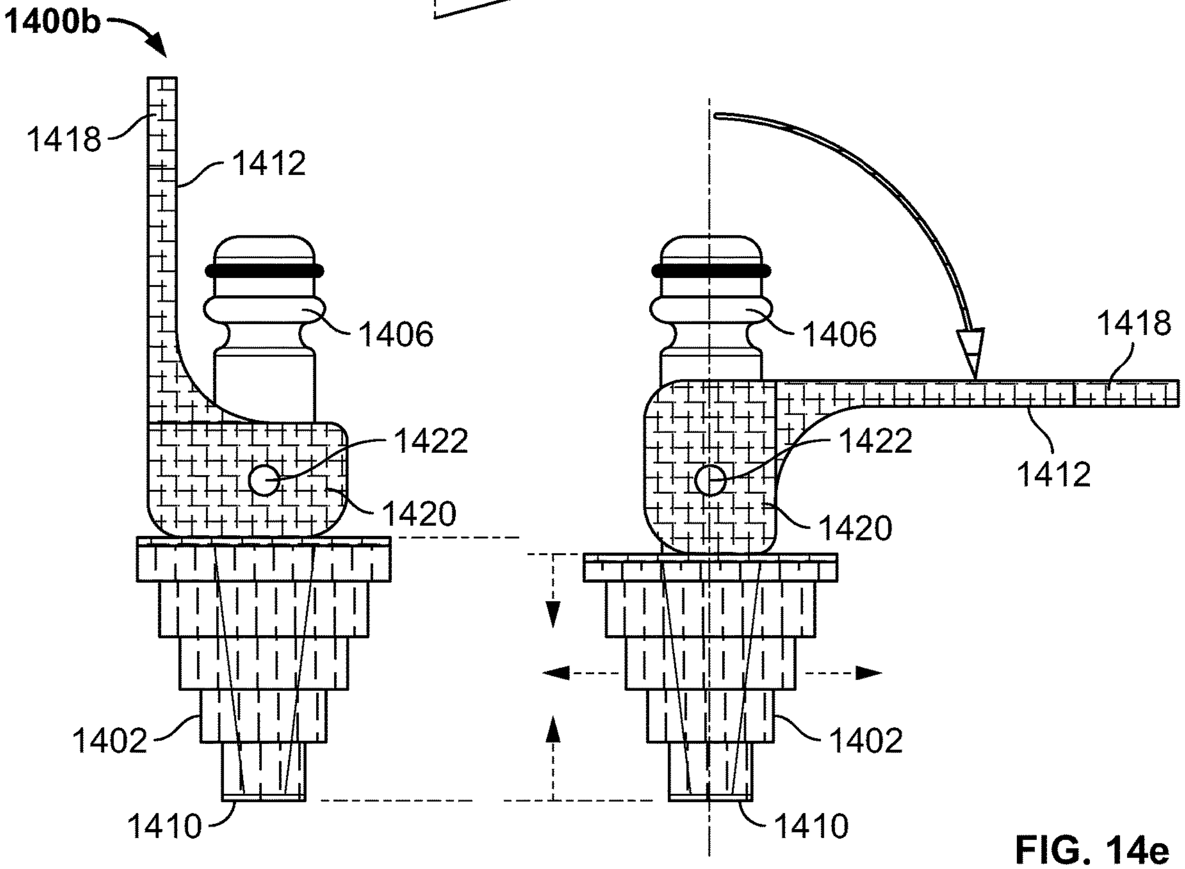

As shown in FIG. 14*e*, the expanding-grip stepped plug 1400*b* includes the fitting section 1406 longitudinally and concentrically extending through the stepped section 1402 along a common axis. The pivot 1422 is orthogonal or perpendicular to the common axis and the cam lever 1412 pivots about the pivot 1422 relative to the fitting section 1406. Therefore, based on such pivoting, the base 1420 is positioned such that the base 1420 compresses and outwardly expands the stepped section 1402 (e.g. tubular members 1408) against the inner surface of the drain line (e.g. wine stopper style).

Figure 15:
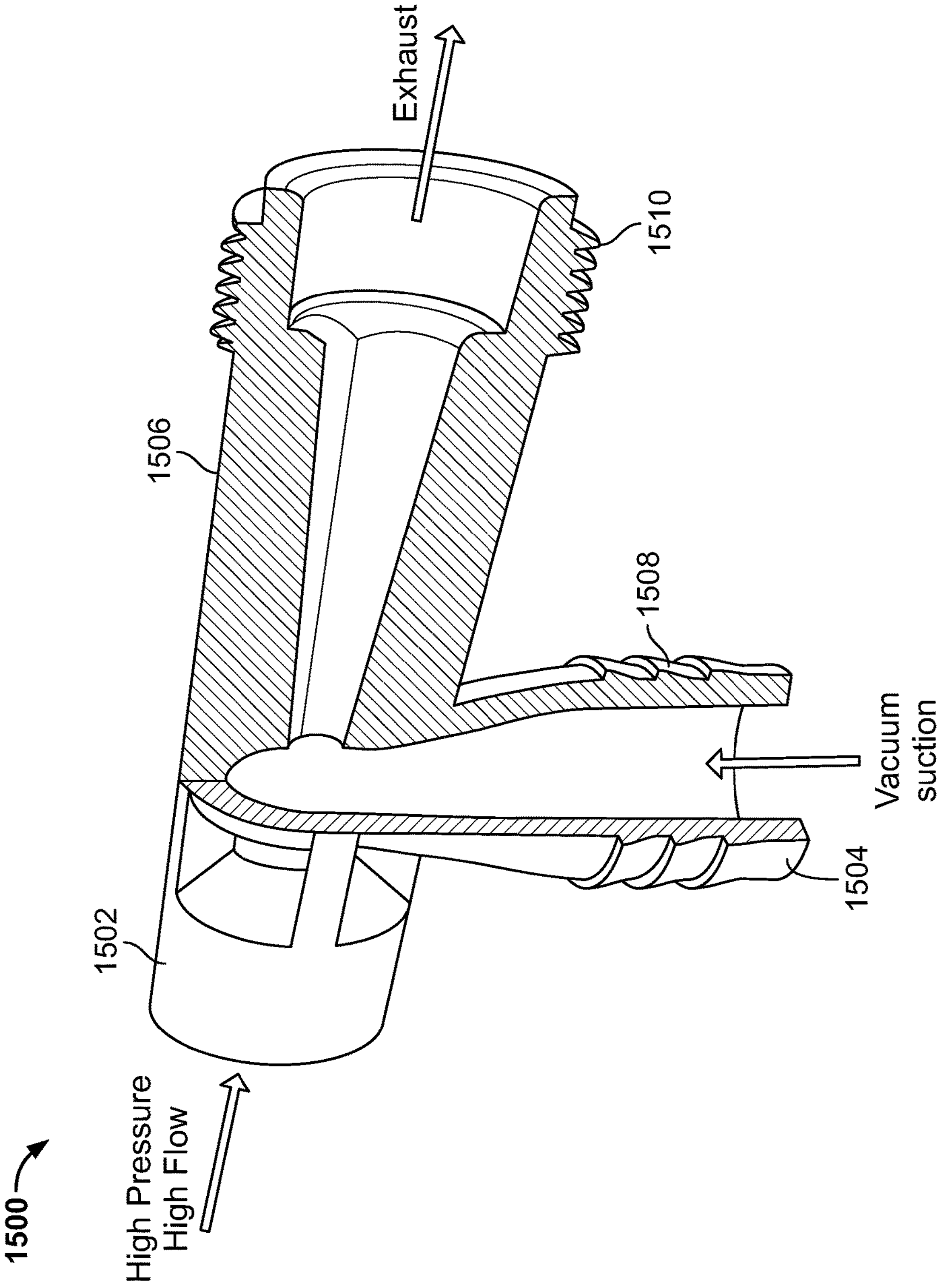
FIG. 15 shows an embodiment of a Venturi effect suction fitting that can be used with a drain gun according to this disclosure.

FIG. 15 shows an embodiment of a Venturi effect suction fitting that can be used with a drain gun according to this disclosure. In particular, a Venturi effect suction fitting 1500 includes a first tubular portion 1502, a second tubular portion 1504, and a third tubular portion 1506. The first tubular portion 1502, the second tubular portion 1504, and the third tubular portion 1506 are arranged with each other such that a T-shape is defined thereby. However, note that this shaping can vary (e.g. Y-shape, W-shape, M-shape, E-shape). For example, although the first tubular portion 1502 and the second tubular portion 1504 are orthogonal or perpendicular with each other, the first tubular portion 1502 and the second tubular portion 1504 can be acutely angled or obtusely angled with each other. Likewise, although the third tubular portion 1506 and the second tubular portion 1504 are orthogonal or perpendicular with each other, the third tubular portion 1506 and the second tubular portion 1504 can be acutely angled or obtusely angled with each other. Similarly, although the first tubular portion 1502 and the third tubular portion 1506 are polar opposite of each other, the first tubular portion 1502 and the third tubular portion 1506 can be acutely angled, obtusely angled, or perpendicular or orthogonally angled with each other. At least two of the first tubular portion 1502, the second tubular portion 1504, or the third tubular portion 1506 are unitary with each other (e.g. single piece inclusive of same material), but can be assembled with each other (e.g. fastening, mating, interlocking, bonding, adhering, magnetizing). At least one of the first tubular portion 1502, the second tubular portion 1504, or the third tubular portion 1506 can include plastic, metal, rubber, shape memory, or other materials, whether rigid, elastic, elastomeric, resilient, or flexible, whether transparent, opaque, or translucent.

Each of the first tubular portion 1502, the second tubular portion 1504, and the third tubular portion 1506 contains an inner channel (e.g. open-shape, closed-shape, symmetrical, asymmetrical, square, rectangular, triangular, pentagon, octagonal, star, uniform internal width, varying internal width, tapered internal width) extending therethrough, whether identical to or non-identical from each other in shape, orientation, diameter, cross-section, or other properties. The inner channel of the first tubular portion 1502 and the inner channel of the third tubular section 1506 are in fluid communication with each other and can be or can avoid being co-aligned along a common axis. The inner channel of the second tubular section 1504 is in fluid communication with the inner channel of first tubular section 1502 and the inner channel of the third tubular section 1506. The inner channel of the second tubular section 1504 is perpendicular or orthogonal to the inner channel of the first tubular section 1502 or the inner channel of the third tubular section 1506. However, this can vary. For example, although the inner channel of the first tubular portion 1502 and the inner channel of the second tubular portion 1504 are orthogonal or perpendicular with each other, the inner channel of the first tubular portion 1502 and the inner channel of the second tubular portion 1504 can be acutely angled or obtusely angled with each other. Likewise, although the inner channel of the third tubular portion 1506 and the inner channel of the second tubular portion 1504 are orthogonal or perpendicular with each other, the inner channel of the third tubular portion 1506 and the inner channel of the second tubular portion 1504 can be acutely angled or obtusely angled with each other. Similarly, although the inner channel of the first tubular portion 1502 and the inner channel of the third tubular portion 1506 are polar opposite of each other, the inner channel of the first tubular portion 1502 and the inner channel of the third tubular portion 1506 can be acutely angled, obtusely angled, or perpendicular or orthogonally angled with each other.

The first tubular portion 1502 is configured for coupling (e.g. mechanical, chemical, fluid, fastening, mating, interlocking, adhering, magnetizing, bonding, friction, snug, nesting) to the drain gun 100 or the drain gun 200 or the tube 1102 or the tip adapter 1108 or a source of a pressurized fluid (e.g. gas tank, elastic bladder, inflatable balloon). The second tubular section 1504 has a plurality of barbs or threads 1508 configured for coupling to a drain line (e.g. outlet, inlet). However, note that the second tubular section 1504 can be configured for coupling to the drain line in many ways (e.g. mechanical, chemical, fluid, fastening, mating, interlocking, adhering, magnetizing, bonding, friction, snug, nesting). The third tubular portion 1506 has a plurality of barbs or threads 1510 configured for coupling to an exhaust tube (e.g. inlet, outlet). However, note that the third tubular section 1506 can be configured for coupling to the exhaust tube in other ways (e.g. mechanical, chemical, fluid, fastening, mating, interlocking, adhering, magnetizing, bonding, friction, snug, nesting). As such, the Venturi effect suction fitting 1500 can be used where at least some access to an inlet of a drain line (e.g. tube, pipe) is restricted or limited or difficult to obtain. In such situations, the Venturi effect suction fitting 1500 employs a Venturi effect with a pressurized fluid (e.g. gas, liquid) to clear an obstruction by suction, from an outlet of the drain line.

In one mode of operation, the first tubular portion 1502 is coupled (e.g. mechanical, chemical, fluid, fastening, mating, interlocking, adhering, magnetizing, bonding, friction, snug, nesting) to an open end portion of a hose (e.g. rigid, flexible) or to the drain gun 100 or the drain gun 200 or a gas tank or a hose or an accessory nozzle or an adapter fitting or others, just like others, as disclosed herein, whether intermediary devices or sources of fluids. The second tubular portion 1504 is coupled (e.g. mechanical, chemical, fluid, fastening, mating, interlocking, adhering, magnetizing, bonding, friction, snug, nesting) to an outlet of a drain line (e.g. conduit) that is clogged. The third tubular portion 1506 is pointed to a safe direction or coupled (e.g. mechanical, chemical, fluid, fastening, mating, interlocking, adhering, magnetizing, bonding, friction, snug, nesting) to another tube or adapter therefor. Then, a pressurized fluid (e.g. gas, liquid, air, nitrogen, water) is input into the first tubular portion 1502 (e.g. cartridge dispensation, drain gun, gas tank). Since the pressurized fluid is input at a high-volume and the pressurized fluid at the high-volume flows from the first tubular portion 1502 to the third tubular portion 1506, then at least some of such flow creates a negative pressure (e.g. suction, vacuum suction) at the second tubular portion 1504. Since the second tubular portion 1504 is coupled to the outlet of the drain line, the negative pressure pulls (e.g. suctions) at least some clogs within the drain line towards the outlet of the drain line and then into the second tubular portion 1504 and then into the third tubular portion 1504, which expels those clogs.

In some embodiments, any devices, as disclosed herein, can be packaged, whether alone or with any others, whether disclosed herein or not, in a kit. For example, the kit can include a package (e.g. plastic bag, sealed bag, storage container, cardboard box, transport package, consumer package, bubble wrap, foam blanket, garment blanket, can, shrink-wrap, molded pulp, blister pack). For example, the package can include a cuboid box, a shipping box, an intermodal container, or others. The package can include one or more devices, as disclosed herein or not disclosed herein. Although various technologies, as disclosed herein, are described in context of HVAC or refrigeration systems, this disclosure is not limited to HVAC or refrigeration systems, but can be used in other contexts. For example, the drain gun 100 or the drain gun 200 can be used to pump inflatables (e.g. vehicular tires, wearable vests, balloons, bladders, water toys, sports balls).

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled artisans understand that typically there is no limit on number of items or terms in any combination, unless otherwise apparent from the context.

As used herein, unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense unless expressly so defined herein.

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" or "substantially" refers to a +/−10% variation from a nominal value/term. Such variation is always included in any given value/term provided herein, whether or not such variation is specifically referred thereto.

Features described with respect to certain embodiments may be combined in or with various some embodiments in any permutational or combinatory manner. Different aspects or elements of example embodiments, as disclosed herein, may be combined in a similar manner.

Although the terms first, second, can be used herein to describe various elements, components, regions, layers, or sections, these elements, components, regions, layers, or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain example embodiments can be combined and sub-combined in or with various other example embodiments. Also, different aspects or elements of example embodiments, as disclosed herein, can be combined and sub-combined in a similar manner as well. Further, some example embodiments, whether individually or collectively, can be components of a larger system, wherein other procedures can take precedence over or otherwise modify their application. Additionally, a number of steps can be required before, after, or concurrently with example embodiments, as disclosed herein. Note that any or all methods or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques or tolerances, are to be expected. Thus, various example embodiments of this disclosure should not be construed as necessarily limited to various particular shapes of regions illustrated herein, but are to include deviations in shapes that result, for example, from manufacturing.

Any or all elements, as disclosed herein, can be formed from a same, structurally continuous piece, such as being unitary, or be separately manufactured or connected, such as being an assembly or modules. Any or all elements, as disclosed herein, can be manufactured via any manufacturing processes, whether additive manufacturing, subtractive manufacturing, or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Various corresponding structures, materials, acts, and equivalents of all means or step plus function elements in various claims below are intended to include any structure, material, or act for performing the function in combination with other claimed elements as specifically claimed. Various embodiments were chosen and described in order to best disclose various principles of this disclosure and various practical applications thereof, and to enable others of ordinary skill in a pertinent art to understand this disclosure for various embodiments with various modifications as are suited to a particular use contemplated.

This detailed description has been presented for various purposes of illustration and description, but is not intended to be fully exhaustive or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. Scope of this disclosure is defined by various claims, which include known equivalents and unforeseeable equivalents at a time of filing of this disclosure.

What is claimed is:

1. A method, comprising:

enabling an end user to:

couple a device to (a) a drain gun hosting a plurality of cartridges storing a plurality of fluids and (b) a drain line of a heating, ventilation, and air conditioning (HVAC) system or a refrigeration system, wherein the drain gun has a handle storing the cartridges side-by-side with each other, wherein the drain gun has a plurality of valves which the cartridges feed, wherein the drain line is clogged; and output the fluids from the drain gun controllably in stages via the valves such that the device engages with the drain line and the drain line is unclogged thereby.

2. The method of claim 1, wherein the device includes a tip adapter forming a seal with the drain line such that the fluids are output from the drain gun controllably in stages to the drain line via the tip adapter.

3. The method of claim 2, wherein the seal is formed with the drain line inside the drain line such that the fluids are output from the drain gun controllably in stages to the drain line via the tip adapter.

4. The method of claim 1, wherein the device includes a shuttle propelling through the drain line via the fluids that are output from the drain gun controllably in stages.

5. The method of claim 1, wherein the device includes an expanding-grip stepped plug forming a seal with the drain line such that such that the fluids are output from the drain gun controllably in stages to the drain line via the expanding-grip stepped plug.

6. The method of claim 5, wherein the expanding-grip stepped plug includes a wingnut section that enables the seal to be formed by rotating the wingnut section such that the fluids are output from the drain gun controllably in stages to the drain line via the wingnut section.

7. The method of claim 5, wherein the expanding-grip stepped plug includes a cam lever and a fitting section, wherein the cam lever defines an internal opening structured such that the fitting section fits therethrough without bending as the cam lever is rotated and the fluids are output from the drain gun controllably in stages to the drain line via the fitting section without bending.

8. The method of claim 5, wherein the expanding-grip stepped plug includes a cam lever and a fitting section, wherein the cam lever is structured such that the fitting section is bent as the cam lever is rotated and the fluids are output from the drain gun controllably in stages to the drain line via the fitting section that is bent.

9. The method of claim 1, wherein the device includes a Venturi effect suction fitting including a first tubular portion, a second tubular portion, and a third tubular portion, wherein the first tubular portion is coupled to the drain gun, wherein the second tubular portion is coupled to the drain line, wherein the fluids are output from the drain gun controllably in stages toward the third tubular portion such that a Venturi effect occurs via the second tubular portion.

10. The method of claim 1, wherein the drain gun includes a plurality of displays that output a plurality of content of indicative of how charged the cartridges are.

11. The method of claim 1, wherein the drain gun includes a plurality of covers that control access to the cartridges.

12. The method of claim 1, wherein the drain gun incudes a plurality of caps that control access to the cartridges.

13. The method of claim 12, wherein the caps are tethered to the drain gun via a plurality of lines.

14. The method of claim 13, wherein the lines recede into the drain gun when the caps contact the drain gun.

15. The method of claim 12, wherein the caps fasten to the drain gun.

16. The method of claim 1, wherein the cartridges are mobile within the drain gun.

17. The method of claim 1, wherein the cartridges are stationary within the drain gun.

18. The method of claim 1, wherein the drain gun provides a haptic output that at least one of the stages is reached.

19. The method of claim 1, wherein the drain gun includes a trigger, wherein the fluids define a full capacity of the cartridges, wherein the full capacity is dispensed at once when the trigger is pulled to a full stroke.

20. The method of claim 1, wherein the drain gun includes a safety lock preventing an unintended output of the fluids controllably in stages.

* * * * *